(12) United States Patent
Tammera et al.

(10) Patent No.: US 8,349,170 B2
(45) Date of Patent: Jan. 8, 2013

(54) FCC REACTOR AND RISER DESIGN FOR SHORT CONTACT-TIME CATALYTIC CRACKING OF HYDROCARBONS

(75) Inventors: Robert F. Tammera, Warrenton, VA (US); Edward Nicholas Jones, Centreville, VA (US); Christopher G. Smalley, Manassas, VA (US); Phillip A. Deis, Clifton, VA (US); Alvin U. Chen, Reston, VA (US); Christopher S. Gurciullo, Nokesville, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 636 days.

(21) Appl. No.: 12/387,834

(22) Filed: May 8, 2009

(65) Prior Publication Data

US 2009/0283445 A1 Nov. 19, 2009

Related U.S. Application Data

(60) Provisional application No. 61/127,532, filed on May 14, 2008.

(51) Int. Cl.
*C10G 11/00* (2006.01)
(52) U.S. Cl. .................................................. 208/113
(58) Field of Classification Search .................... 208/113
See application file for complete search history.

(56) References Cited

U.S. PATENT DOCUMENTS

| | | | |
|---|---|---|---|
| 3,957,443 A * | 5/1976 | Strickland et al. | 422/145 |
| 4,118,338 A * | 10/1978 | Gross et al. | 502/40 |
| 4,394,349 A | 7/1983 | Cartmell | |
| 4,579,716 A | 4/1986 | Krambeck et al. | |
| 4,588,558 A * | 5/1986 | Kam et al. | 422/113 |
| 4,606,814 A | 8/1986 | Haddad et al. | |
| 4,623,446 A | 11/1986 | Haddad et al. | |
| 4,869,880 A | 9/1989 | Hettinger, Jr. et al. | |
| 5,190,650 A | 3/1993 | Tamamera et al. | |
| 5,296,131 A | 3/1994 | Raterman | |
| 5,368,721 A | 11/1994 | Terry et al. | |
| 5,591,411 A | 1/1997 | Terry et al. | |
| 5,665,949 A | 9/1997 | Fusco et al. | |
| 6,063,263 A | 5/2000 | Palmas | |
| 6,538,169 B1 | 3/2003 | Pittman et al. | |
| 7,150,860 B1 | 12/2006 | Palmas et al. | |

* cited by examiner

*Primary Examiner* — Randy Boyer
(74) *Attorney, Agent, or Firm* — Bruce M. Bordelon

(57) ABSTRACT

The present invention is an improved design and operation of a short contact time Fluid Catalytic Cracking (FCC) Reactor wherein the upper internal riser and a lower internal riser are in fluid connection with one another and provide an improved disengaging zone for entraining the vapors from the dilute phase area of the FCC reactor. Detailed preferred embodiments include improvements over the prior art to the internal central riser, riser termination apparatus, cyclone separators, and a coke mitigation baffle system, as well as associated improved fluid catalytic cracking processes utilizing the novel reactor design.

17 Claims, 12 Drawing Sheets

FCC REACTOR AND RISER DESIGN FOR SHORT CONTACT-TIME CATALYTIC CRACKING OF HYDROCARBONS

This application claims the benefit of U.S. Provisional Application No. 61/127,532 filed May 14, 2008.

FIELD OF THE INVENTION

The present invention relates to an improved design and operations of a short contact time Fluid Catalytic Cracking (FCC) Reactor. In particular, the present invention relates to an improved design of the FCC Reactor internal central riser, riser termination apparatus, cyclone separators, and a coke mitigation baffle system, as well as associated improved fluid catalytic cracking processes utilizing the novel reactor design.

BACKGROUND OF THE INVENTION

Conversion of high molecular weight petroleum feeds to more valuable products by catalytic processes such as fluidized catalytic cracking is important to petroleum processes. In the fluidized catalytic cracking process, higher molecular weight feeds are contacted with fluidized catalyst particles in the riser reactor of the fluidized catalytic cracking unit. The contacting between feed and catalyst is controlled according to the type of product desired. In catalytic cracking of the feed, reactor conditions such as temperature and catalyst circulation rate are controlled to maximize the products desired and minimize the formation of less desirable products such as light gases and coke.

Miscellaneous fluidized catalytic cracking reactor riser and reactor vessel designs have been utilized in the past. However, with the advance of zeolitic cracking catalysts with greatly improved cracking activity, most modern fluidized catalytic cracking reactors utilize a short contact-time cracking configuration. With this configuration, the time in which the catalyst and the fluidized catalytic cracker feedstream are in contact is limited in order to minimize the amount of excessive cracking which results in the increased production of less valued products such as light hydrocarbon gases as well as increased coking deposition on the cracking catalysts. Short contact-time riser reactor designs are relatively new to the petrochemical industry, but have gained wide-spread acceptance and use in the industry due to the ability of optimizing hydrocarbon cracking products and yields in conjunction with the use of modern cracking catalysts. One such design for short contact-time fluid catalytic cracking reactor riser designs is illustrated in U.S. Pat. No. 5,190,650 to Tammera et al.

Most short-contact time fluidized catalytic cracking configurations utilize a reactor riser cracking configuration wherein the catalyst is contacted with the fluidized catalytic cracker feedstock in a reactor riser, and the catalyst and the hydrocarbon reaction products are separated shortly after the catalyst and hydrocarbon mixture leaves the reactor riser and enters the fluidized catalytic cracking reactor. Although there are many different fluidized catalytic cracking reactor designs in use, most use mechanical cyclones internal to the reactor to separate the catalyst from the hydrocarbon reactor products as quickly and efficiently as possible. This rapid separation process has the benefits of both minimizing post-riser reactions between the catalyst and the hydrocarbons as well as providing a physical means for separating the cracked hydrocarbon products for further processing from the spent catalyst which is regenerated prior to reintroduction of the regenerated catalyst back into the reaction process.

Significant improvements in catalyst technology have led to most conventional fluidized catalytic cracking reactors being designed for short contact-time processing. That is, it is desired that cracking reactions be significantly limited to the reaction in the reactor riser followed by a very fast separation of hydrocarbons from the catalysts in order to prevent unwanted reactions or "overcracking" of the hydrocarbon feedstocks and/or reaction products. Therefore, most modern fluidized catalytic cracking units incorporate a quick hydrocarbon/catalyst separation mechanism after the hydrocarbon/catalyst stream leaves the reactor riser. Mechanical cyclones, as discussed above, are generally the most common method utilized for making the bulk of the catalyst/oil separation in the fluidized catalytic cracking processes.

U.S. Pat. No. 5,190,650 to Tammera et al. also illustrates a common feature in short contact-time fluid catalytic reactor riser designs in that a "gap" or "disengaging zone" between the reactor riser and the primary cyclones is commonly supplied in the design of the reactor. This is also illustrated in FIG. 1 of the present application which illustrates this prior art. This gap is incorporated between the riser and the primary cyclones in "negative pressure" reactor designs, wherein the primary cyclones are operated at a lower (or negative pressure) in relation to the dilute phase of the FCC reactor. This gap can also be incorporated between the primary cyclones and secondary cyclones in "positive pressure" reactor designs, wherein the primary cyclones are operated at a higher (or positive pressure) in relation to the dilute phase of the FCC reactor. This gap or "disengaging zone" is utilized to allow the removal of hydrocarbon vapors and steam from the FCC reactor via the cyclones.

U.S. Pat. No. 4,606,814 to Haddad et al. illustrates an FCC riser/cyclone arrangement wherein the riser is attached to a cyclone without a gap. In this invention, some of the catalyst in the riser is separated prior to the primary cyclone. Additionally, due this design, some of the hydrocarbons are also entrained in the catalyst of this first separation. This leads to uncontrolled catalyst/hydrocarbon contact time and can lead to overcracking of the hydrocarbon feed materials. Additionally, a significant portion of the hydrocarbons enter the dilute phase of the reactor and must reenter the reactor riser, again leading to overcracking of the hydrocarbon feed materials.

U.S. Pat. No. 4,394,349 to Cartmell illustrates a similar arrangement to the Haddad reference wherein at least a significant portion of the catalyst and hydrocarbons in the reactor riser are allowed to be removed to the dilute phase section of the reactor. Similar to the Haddad design, this uncontrolled catalyst/hydrocarbon contact time in the dilute phase of the FCC reactor results in undesired overcracking of the hydrocarbon feed materials.

U.S. Pat. No. 5,368,721 to Terry et al. illustrates a reactor riser arrangement in which a disengaging zone is provided for in the reactor riser. However, in the Terry invention, the bottom portion of the riser is increased in cross-sectional area to decrease the "slip velocity" of the reaction stream, followed by a "slip velocity increasing means" and further a "velocity reducing means". These elements tend to increase the resistance in the riser and provide additional hardware that can be subject to fouling. These elements also have the effect of a reduction of flow velocities in the reactor riser followed by an increase in the flow velocities in the reactor riser. These alternating velocities in the reactor riser can lead to undesirable pressure fluctuations in the reactor, riser, and/or cyclones. Additionally, the reduced overall velocity of the reaction stream in the riser can lead catalyst dropout from the riser and the loss of hydrocarbon feed into the dilute phase of the reactor through the riser disengaging zone.

U.S. Pat. No. 4,579,716 to Krambeck et al. (referred to herein as "Krambeck") and U.S. Pat. No. 4,588,558 to Kam et al. (referred to herein as "Kam") (both patents collectively referred to herein as the Krambeck/Kam patents) feature a disengaging zone in the FCC reactor similar to the present invention. These two patents assigned to Mobil Oil Corporation are based on similar designs and have similar deficiencies. One major deficiency with these designs is that they cannot be operated properly unless there is a very high amount of concentricity between the lower portion of the riser and the upper portion of the riser in the disengaging zone. In particular, in the Kam patent it is stated that "the two portions of the riser must be aligned so the maximum eccentricity is 10%" (see Kam, U.S. Pat. No. 4,588,558, column 6, lines 9-10). As explained in Kam, if the two portions of the riser are not maintained in a "substantially concentric relationship to each other", significant backmixing of catalyst and hydrocarbons will occur (see Kam, U.S. Pat. No. 4,588,558, column 6, lines 2-8). The problem with the Krambeck/Kam designs is that due to the high temperatures in the FCC reactors (typically in the range of about 950 to 1250° F.) and resulting significant thermal expansion of the reactor components, it is difficult, if not impossible, to maintain this degree of concentricity under operating conditions. In order to address this problem, the Krambeck/Kam patents attempted three ways in which to address this problem.

The first, and simplest, manner in which this concentricity problem was addressed by the Krambeck/Kam designs is by using "mechanical spacers" to maintain the concentricity of the upper and lower risers. This is illustrated in U.S. Pat. No. 4,588,558 to Kam et al. wherein "three or more spacers 45 are provided between the two sections of the riser to maintain the two sections concentric and separated from each other by an equal distance" (see Kam, U.S. Pat. No. 4,588,558, column 9, lines 37-40; and element 45 in FIG. 1). However, there are multiple problems with this design. The first resulting problem is that these spacers constrict the flow area of the annulus resulting in higher pressure drop and uneven flow patterns for the entering vent gas from the dilute phase of the reactor. The second resulting problem is that this creates erosive material conditions between the spacers and the riser. This is especially problematic for design as it is desired that the riser internal to be covered with an erosion resistant refractory or coating to protect from wear induced by the high velocity catalyst moving through the riser as well as entrained catalyst entering the annulus from the FCC reactor dilute phase. This spacer design leaves an exposed area for catalyst and mechanical contact wear thereby reducing the mechanical reliability of the design. The third resulting problem, and possibly most significant drawback of the spacers design is that the upper and lower risers transfer mechanical forces between each other via the spacers, which due to the induced thermal expansion of these components being in different directions relative to one another, can create significant unwanted mechanical forces emanating from the lower internal riser unto the upper internal riser as well as the attached cyclone configuration. This results in significant mechanical overdesign of related components as well as reduced reliability of the unit. What is needed in the art is a design that does not rely on spacers or mechanical contact points between the upper and lower riser assemblies.

The second manner, in which this concentricity problem was addressed by the Krambeck/Kam designs is by the installation of "trickle valves" in the conduits between the riser and the primary cyclones, as well as in the conduits between the primary cyclones and secondary cyclones. These can be seen in U.S. Pat. No. 4,579,716 to Krambeck et al. in FIG. 1 as elements 27, 27A, 41, and 41A, and in U.S. Pat. No. 4,588,558 to Kam et al. as elements 22 and 38. It is believed that the use of these trickle valves was to compensate for erratic flows and pressure surges that can accompany the use of the Krambeck/Kam designs. The resulting problem with this design is that it results in reinstituting one of the main problems that is trying to be eliminated by installing the disengaging zone in the riser. The problem is that in the present art, the opening or gaps are installed in the conduits in the same general locations as the trickle valves in the Krambeck/Kam designs and are both prone to a large amount of backmixing of catalysts (solids) and hydrocarbons (vapors) as well as excessive coking. What is needed in the art is a design that does not rely on secondary openings in the cyclone conduits for the entry or expulsion of catalysts and hydrocarbons to and from the dilute phase section of the FCC reactor.

Lastly, a third manner in which this concentricity problem was addressed by the Krambeck/Kam designs relies on openings (or "gaps") in the conduit between the riser and the primary cyclones. This is shown in U.S. Pat. No. 4,579,716 to Krambeck et al. in FIG. 1 as elements 22 and 38. This design again imposes the same problems which are desired to be eliminated and discussed in the paragraph above.

It should also be noted that due, probably at least in part, to the drawbacks in the Krambeck/Kam designs identified and discussed above, a design incorporating a disengaging zone in the reactor riser as shown in the Krambeck/Kam references was never commercially implemented by Mobil Oil Corporation.

What is required in the industry is an improved FCC reactor design which can ensure that substantially all of the hydrocarbon feed and catalyst in the reactor riser is delivered to the cyclone system for effective and controlled separation and does not impart significant feed fluctuations or hardware in the reactor riser, while improving the mechanical design of the overall system.

SUMMARY OF THE INVENTION

An improved FCC reactor mechanical design and an improved fluid catalytic cracking process for converting heavy hydrocarbons into more valuable lower molecular weight hydrocarbons utilizing said mechanical design.

A preferred embodiment of the present invention is a fluid catalytic cracking reactor vessel, comprising:

a) a lower internal reactor riser, wherein a portion of the lower internal reactor riser is located within the fluid catalytic cracking reactor vessel, and wherein the lower end of the lower internal reactor riser is attached to the shell of the fluid catalytic cracking reactor vessel; and b) an upper internal reactor riser located within the fluid catalytic cracking reactor vessel, wherein the lower end of the upper internal reactor riser terminates in a conical section which is connected to a cylindrical sleeve; wherein the upper section of the upper internal reactor riser is not in fluid connection with the dilute phase section of the reactor vessel, and at least two riser outlet ports are mechanically connected to the upper section of the upper internal reactor riser;

wherein the upper end of the lower internal reactor riser is in fluid connection with the upper internal reactor riser and the dilute phase section of the reactor vessel; the lower internal reactor riser is not mechanically connected to the upper internal reactor riser; the largest diameter of the conical section of the upper internal reactor riser is larger than the diameter of the upper end of the lower internal reactor riser; the cylindrical sleeve of the upper internal reactor riser has a diameter larger than the diameter of the upper end of the lower internal reactor riser; at least a portion of the cylindrical sleeve of the upper internal reactor riser overlaps with at least a portion of the upper end of the lower internal reactor riser; and there is no mechanical means located in the region of the overlapping portion of the cylindrical sleeve of the upper internal reactor riser and the upper end of the lower internal reactor riser for restricting the eccentricity between the cylindrical sleeve and the upper end of the lower internal reactor riser.

In a more preferred embodiment of the fluid catalytic cracking reactor vessel, the length of the overlapping portion of the cylindrical sleeve of the upper internal reactor riser and the upper end of the lower internal reactor riser is from about 6 to about 36 inches when the fluid catalytic cracking reactor vessel is in the operating (hot) condition. In an even more preferred embodiment, the acute angle between the conical section of the upper internal reactor riser and the axis of the upper internal reactor riser is from about 5° to about 25°. In yet another preferred embodiment of the fluid catalytic cracking reactor vessel the riser section is comprised of a transition length, as measured from the top of the lower internal reactor riser to the bottom of the conical section, wherein this transition length is from about 6 to about 36 inches when the fluid catalytic cracking reactor vessel is in the operating (hot) condition.

Another preferred embodiment of the present invention is a fluid catalytic cracking process, utilizing the fluid catalytic cracking reactor vessel above, wherein the process steps comprise:

a) injecting a heavy hydrocarbon feed through one or more feed nozzles connected to an external fluid cracking reactor riser section wherein the external fluid cracking reactor riser section is in fluid connection with a lower internal reactor riser located inside of a fluid catalytic cracking reactor vessel;

b) contacting the heavy hydrocarbon feed with a hot fluidized catalyst in the external fluid cracking reactor riser;

c) passing at least a portion of the heavy hydrocarbon feed and the hot fluidized catalyst through the lower internal reactor riser;

d) passing at least a portion of the heavy hydrocarbon feed and the hot fluidized catalyst from the lower internal reactor riser to an upper internal reactor riser; and e) retrieving a fluid catalytically cracked product stream and a spent catalyst stream from the fluid catalytic cracking reactor vessel;

wherein at least a portion of the heavy hydrocarbon feed is catalytically cracked into lower molecular weight hydrocarbon compounds which are retrieved as the fluid catalytically cracked product stream.

In a more preferred embodiment of the fluid catalytic cracking process the velocity of the hydrocarbon-containing vapor through the annular gap between the cylindrical sleeve of the upper internal reactor riser and the upper end of the lower internal reactor riser is about 10 to about 30 ft/sec. In yet a more preferred embodiment, the process is operated wherein the eccentricity between the cylindrical sleeve of the upper internal reactor riser and the upper end of the lower internal reactor riser is greater than 10% in the operating (hot) position, with virtually no loss of catalyst (less than 1% by weight) from the riser to the dilute phase region of the fluid catalytic cracking reactor vessel.

DETAILED DESCRIPTION OF THE INVENTION

The present invention relates to a novel Fluid Catalytic Cracking (FCC) Reactor design which improves both the mechanical reliability and process performance of the FCC unit. The design herein allows for reduced thermal stresses on the reactor internals, tighter design clearances, improved process yields and reduced maintenance costs. This improved reactor design also significantly improves the simplicity of reactor design and construction, resulting in a substantial decrease in the amount of field work required for installation, resulting in substantial reductions in overall construction costs and substantial reductions in the overall unit downtime required for the reactor internal equipment to be installed.

Typically, the preferred modern design and operation of Fluid Catalytic Cracking (FCC) reactors utilize a short contact-time reactor riser design to catalytically crack heavy hydrocarbon feeds (or "FCC feeds") comprised of high molecular weight hydrocarbons into lower molecular weight, more valuable hydrocarbon fuel products. In short contact-time FCC reaction processes, the hydrocarbon feed is contacted with a highly active fluidized catalyst under highly controlled reaction conditions and durations. It is preferred that the hydrocarbon feed and catalyst are contacted under cracking conditions in the "reactor riser" and that these reactions substantially occur in the short time that the hydrocarbons and catalyst are in contact with each other as they travel through the reactor riser. Since the time that the hydrocarbon feed/catalyst stream is in contact can be well controlled in the reactor riser, it is desirable that the catalyst and hydrocarbon feed (now the "cracked hydrocarbon products") be separated as quickly and completely as possible to avoid unwanted cracking reactions (or "overcracking"). It is generally desired in the FCC reaction to maximize liquid products, especially such hydrocarbon products as to be used in gasoline fuel, jet fuel, or diesel fuels, while minimizing the production of solids ("coke") and "light gases" (typically $C_4$ hydrocarbons and lighter, which are gases at approximately atmospheric conditions).

Any conventional FCC feed can be used with the reactor design of the present invention. Such feeds typically include heavy hydrocarbon feeds boiling in the range of about 430° F. to about 1050° F. (220-565° C.), such as gas oils, heavy hydrocarbon oils comprising materials boiling above 1050° F. (565° C.); heavy and reduced petroleum crude oil; petroleum atmospheric distillation bottoms; petroleum vacuum distillation bottoms; pitch, asphalt, bitumen, other heavy hydrocarbon residues; tar sand oils; shale oil; liquid products derived from coal liquefaction processes; and mixtures thereof. The FCC feed may also comprise recycled hydrocarbons, such as light or heavy cycle oils. Preferred feeds for use in the present process are vacuum gas oils boiling in the range above about 650° F. (343° C.).

Figure 1:
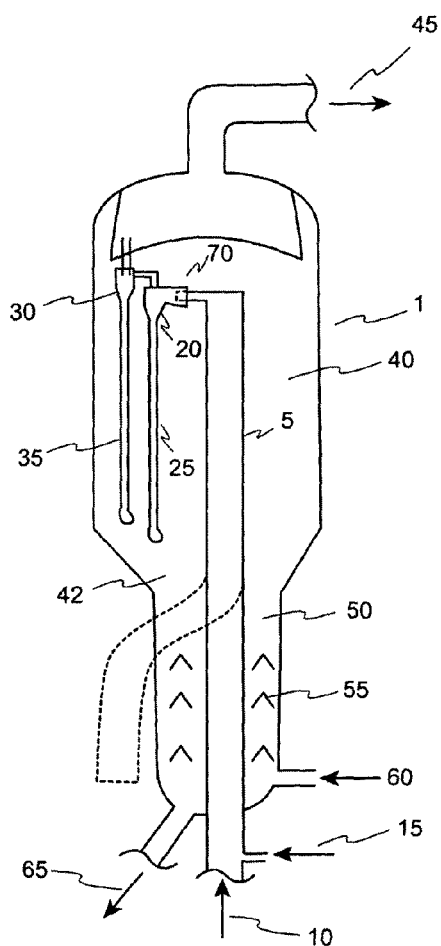
FIG. 1 illustrates a typical short contact-time FCC reactor riser/cyclone configuration of the prior art.

FIG. 1 is a simplified illustration of a typical commercial embodiment of a short contact-time FCC reactor of the prior art; in particular the reactor riser and mechanical cyclone ("cyclone") arrangement. Herein, the FCC reactor (1) has an internal reactor riser (5). The internal reactor riser may enter from the bottom of the reactor (as shown in solid lines) or may enter the side of the reactor (as shown in the dotted lines). Both are considered "internal risers" herein and the present invention will work with either internal riser design. Typically, the risers are made of a continuous tubular design wherein the only outlets from the riser are fluidly connected to the mechanical cyclones. In an FCC reactor riser design, a fluidized catalyst (10) is contacted with at least one heavy hydrocarbon feedstream (15) in the internal riser (5). Here, the conditions IS and duration of contact between the hydrocarbon feedstream and the catalyst can be accurately controlled to produce a reaction product stream comprising a cracked hydrocarbon product and a spent catalyst. Typically, the desired reactions will occur within seconds and if the cracked hydrocarbon product and a spent catalyst are not quickly and efficiently separated from each other, undesired continued reactions or overcracking will tend to occur resulting in a less desired cracked hydrocarbon product composition and/or yield and the overall resultant reactions will tend to increase unwanted coke and light gas make.

Therefore, it is desirous to take substantially all of the product stream comprising a cracked hydrocarbon product and a spent catalyst and quickly separate the stream components. A preferred method for separating the cracked hydrocarbon product and the spent catalyst is through the use of mechanical cyclones. FIG. 1 shows a FCC reactor with a two-stage cyclone arrangement. Here, the internal riser (5) is fluidly connected to a primary cyclone (20). For simplicity purposes, only one set of primary cyclones (20) and one set of secondary cyclones (30) are shown in FIG. 1. However, in practice, a two-stage cyclone FCC reactor is normally comprised of from about 2 to 8 sets of primary/secondary cyclones.

Continuing with FIG. 1, the configuration shown is a "close-coupled cyclone" design since substantially all of cracked hydrocarbon product is conducted from the internal reactor riser (5), to the primary cyclone (20), and further to the secondary cyclone (30) which can then be retrieved as product. In this close-coupled cyclone design, it is desired to minimize any hydrocarbons released into the dilute phase area (40) of the FCC reactor (1). Additionally, it is desired that substantially all of the spent catalyst passes from the internal riser (5) to the primary cyclone (20), where the spent catalyst is quickly and efficiently stripped of the cracked hydrocarbon products prior to the separated spent catalyst being returned to the dense phase (42) of the FCC reactor (1) via the primary cyclone dipleg (25). In this manner, the cracked hydrocarbon products are separated from the spent catalyst in a highly time-controlled and effective manner allowing the catalytic cracking reaction time to be very accurately controlled. Following the product stream of FIG. 1 further, substantially all of any remaining spent catalyst in the cracked hydrocarbon products is further separated in the secondary cyclones (30) and the separated spent catalyst is returned to the dense phase (42) of the FCC reactor (1) via the secondary cyclone dipleg (35). An FCC overhead hydrocarbon product stream is collected from the vapor outlet of the secondary cyclones and retrieved via the reactor overhead line (45).

As discussed, it is generally desirable to separate as completely and as quickly as possible the cracked hydrocarbon products and the spent catalyst following the desired reaction time. Therefore, it is both desired to 1) to minimize the amount of cracked hydrocarbon products that migrate to the dilute phase and similarly, 2) to maximize the separation of the cracked hydrocarbon products from the spent catalyst prior to returning the spent catalyst to the dilute phase area of the reactor. This is due to the fact that hydrocarbons left to contact the spent catalyst in the FCC reactor will continue to crack under uncontrolled conditions, resulting in an increase in undesired products from the process.

Returning to FIG. 1, the FCC reactor (1) is also comprised of a stripping area (50). Although not necessary, the stripping area is typically located below a transition zone in the FCC reactor and the stripping area is comprised of trays or sheds (55). Into the stripping zone, a stripping gas (60), usually comprising steam, is injected and the stripping gas assists in removing volatile hydrocarbons that may remain on the spent catalyst. The trays or sheds (55) in the stripper zone assist in maximizing contact between the spent catalyst and the stripping gas. The spent catalyst is removed via a spent catalyst line (65) where it can be regenerated for reuse in the catalytic cracking process. The stripping gases and the stripped volatile hydrocarbons migrate up the into the FCC reactor (1) to the dilute phase (40) of the reactor where they can be removed with the cracked hydrocarbon products from the fluid catalytic cracking process.

It should be noted here that in close-coupled cyclone designs of the prior art, a disengaging zone (70) is normally supplied in the conduit between the riser (5) and the primary cyclones (20). Alternatively, this disengaging zone (70) can be supplied in the conduit between the primary cyclones (20) and the secondary cyclones (30) (this alternate configuration is not shown in FIG. 1). The purpose of the disengaging zone is to allow for the vapor phase components in the reactor dilute phase area (40), such as remaining volatile hydrocarbons and stripping gases, to be removed from the FCC reactor (1). However, there are drawbacks associated with the disengaging zone being located in the vicinity of the cyclones and there are benefits that can thus be achieved in the configurations of the present invention. These drawbacks and benefits will be discussed further as the present invention is discussed in detail below.

Figure 2:
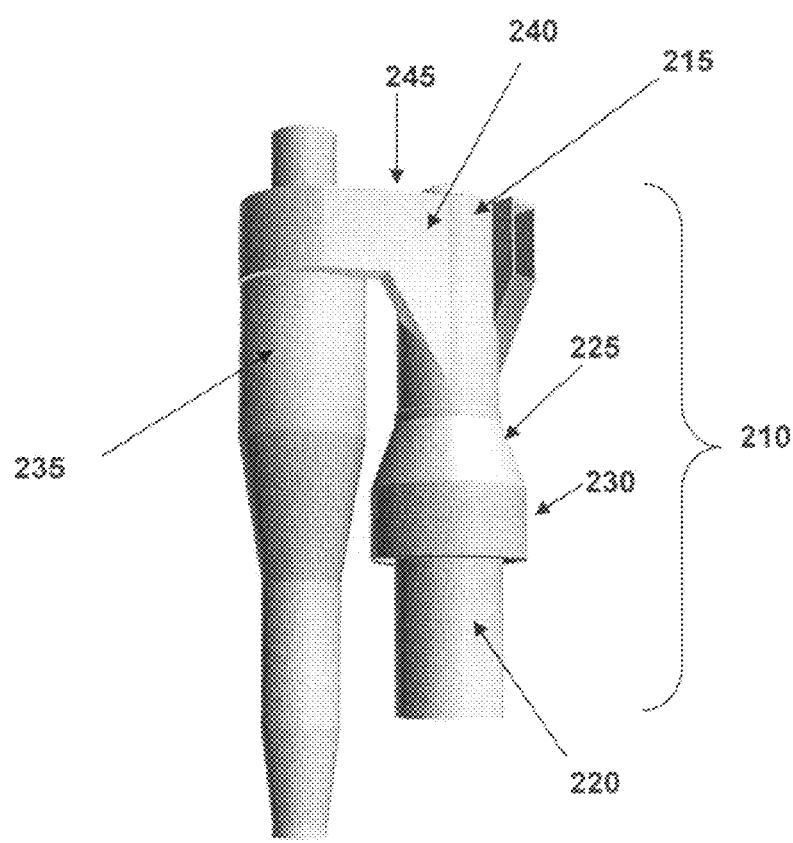
FIG. 2 illustrates an embodiment of the internal upper riser and lower riser design of the present invention in conjunction with one of the primary cyclones shown.

A preferred embodiment of the present invention is shown in FIG. 2. FIG. 2 shows only a portion of the FCC reactor of the present invention. Here, the internal riser (210) is segregated into both an upper riser (215) and a lower riser (220). The upper riser (215) is comprised of upper conical shaped section (225) which is connected at the large end of the cone to a cylindrical sleeve (230) which concentrically fits around and overlaps a portion of the lower riser (220). It can further be seen that the upper riser is mechanically connected to the primary cyclone(s) (235) in the FCC reactor by an upper riser transition conduit (240) and that the disengaging zones of the prior art designs in the conduits associated with the primary and secondary cyclones have been eliminated (i.e., there is not gap at connection point (245) between the upper riser transition conduit and the primary cyclone). It should be noted that while the upper riser/conical section (215/225/230) is in fluid contact with the lower riser section (220), that the two section are not in mechanical contact with one another.

Figure 3A:
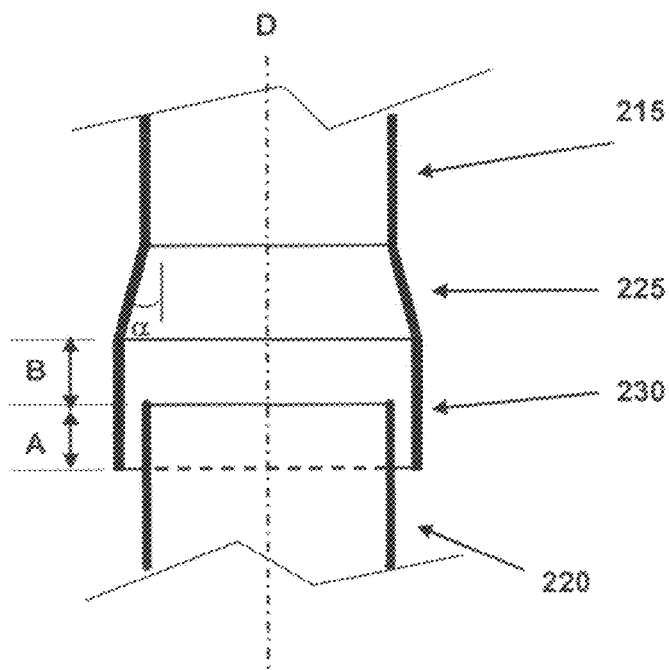
FIG. 3A illustrates a cross-sectional schematic elevation view of an embodiment of the upper riser and lower riser relationship of the present invention.

FIG. 3A shows this interface portion between the upper and lower riser assemblies of the present design in greater detail, illustrating an elevated cross-section of the upper riser and lower riser of the present invention at the interface point. FIG. 3A, illustrates the relative position of the upper riser (215) and its associated upper conical section (225) and sleeve (230) as well as the lower riser (220).

Figure 3B:
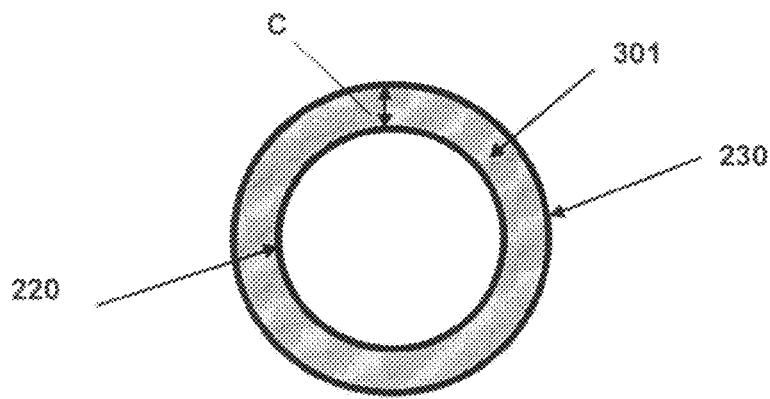
FIG. 3B illustrates a cross-sectional schematic plan view of an embodiment of the upper riser and lower riser connection of the present invention.

The term "annular gap area" (in square inches) as used herein is defined as the cross-section area defined by a ring (or other shape if riser is non-circular) as measured in a plane orthogonal to the axis of the lower riser wherein the plane is located at the upper face of the lower riser, in the cold and concentric position. The outer portion of this ring being defined by the internal wall of the sleeve (230) at its intersection with the plane. The inner portion of this ring being defined by the external wall of the lower riser (220) at its intersection with the plane. This is illustrated in FIG. 3B wherein the annular gap area is shown as the shaded area (301) in the plane orthogonal to the axis of the lower riser between the internal wall of the sleeve (230) and the external wall of the lower riser (220).

The term "annular gap" as used herein is the distance (in inches) between the internal wall of the sleeve (230) and the external wall of the lower riser (220) at its intersection with the plane as measured in the plane, in the cold and concentric position. The "annular gap" is illustrated as dimension (C) in FIG. 3B. If the sleeve and lower riser are not circular in cross section, then the annular gap is the largest dimension between the internal wall of the sleeve (230) and the external wall of the lower riser (220) in the cold and concentric position. In preferred embodiments of the present invention, the annular gap is at least about 1 inch. In more preferred embodiments, the annular gap is from about 1 inch to about 4 inches, and even more preferably, the annular gap is from about 1.5 inches to about 3 inches. In a most preferred embodiment, the annular gap is from about 1 inch to about 4 inches and is sized with the operating conditions of the FCC reactor to maintain the vent velocity to within the ranges specified herein throughout normal operating conditions. The term "normal operating conditions" as used herein is defined as 75 to 110% of an FCC reactor's design hydrocarbon feed rate.

Returning to the present invention as shown in FIG. 3A, this configuration is defined as having a lower riser section (220) overlapped by an upper riser section (215) with a cone (225) and sleeve (230) arrangement where the sleeve wall is substantially parallel to the lower riser wall (220). Experimental tests were conducted to provide guidance on the preferred choice of dimensions and will be discussed further herein. In a preferred embodiment, the length of the "overlap" as shown as dimension (A) in FIG. 3A, should be at least 6 inches when the unit is cold. The length of the overlap is preferably from about 6 to about 36 inches, more preferably from about 9 to about 24 inches, and 5 even more preferably from about 9 to about 15 inches when the unit is in the hot (i.e., operating) condition.

One item that has been unexpectedly discovered in cold flow experiments by the present inventors is the benefit of incorporating a "transition" length in the disengaging zone design of the present invention. It is believed that one of the significant problems with the designs in the Krambeck and Kam patent discussed in the Background of the Invention section herein, is that a transition length was not incorporated into their designs, and in some instances, the cone and the lower reactor riser may have overlapped. What has unexpectedly been discovered is that some transition length is required in the design of the present invention for proper operation. This is especially critical when the present invention is run in a non-concentric (or "eccentric") configuration. The term "transition length" as used herein is illustrated in FIG. 3A as dimension (B) and is defined as the distance between the face of the top of the lower riser (220) and the point of the intersection of the cone (225) and the sleeve (230), as measured along the axis (D) of the upper riser (215). Additionally, as can be seen in FIG. 3A, the sum of the "transition length" dimension (B), and the "overlap" dimension (A) equals the overall height of the sleeve (230).

Additionally, another significant discovery is the benefit of incorporating fairly shallow cone angle in the disengaging zone design of the present invention. The term "cone angle" as used herein is illustrated in FIG. 3A as angle alpha ($\alpha$) and is defined as the acute angle between the cone (225) and the upper riser wall (215). It should be noted that the latitude in the ranges of these two design aspects, i.e., the transition length and the cone angle, for successful operation of the present invention tend to be somewhat dependent upon one another as will be discussed further.

While not wishing to be held to any specific theory, it is believed that of the deficiencies with the prior art Krambeck and Kam patents is the importance of the transition length as well as the cone angle. As can be seen from these references, there is not mention of either a transition length or a cone angle. The Figures of the Krambeck and Kam patents seem to infer that there was not any transition length incorporated in their designs and that the cone angle was basically about 45° (see FIG. 1 of U.S. Pat. No. 4,579,716 to Krambeck et al., as well as FIG. 1 of U.S. Pat. No. 4,588,558 to Kam et al.). What the inventors herein have confirmed is that with no transition length and a highly angled cone as shown by the Krambeck and Kam patents, that the prior art designs are highly sensitive the eccentricity of the upper and lower risers. As can be seen discussed in the Kam and Krambeck patents, this was also experienced in their testing of their designs. In particular, when the eccentricity gets above about 10% (as discussed in U.S. Pat. No. 4,588,558 to Kam et al.), a disruptive flow pattern occurs in the area of the disengaging zone causing significant amounts of backmixing of both hydrocarbons and catalyst in the FCC reactor.

It should be noted that the term "backmixing" as used herein means the amount of hydrocarbons (also termed as the "vapors") or catalyst (also termed as the "solids") escape from the riser disengaging zone, or other disengaging zones/vents in the cyclone arrangements, into the dilute phase area of the FCC reactor. Also, the term "eccentricity" or "E" as used herein is defined by the formula:

$$\text{Eccentricity } "E" = (S/S_0 - 1) \times 100$$

wherein:
S=the largest ring dimension as shown as dimension (C) in FIG. 3A in the operating position (including non-concentric positions). and
$S_0$=the "annular gap" is shown as dimension (C) in FIG. 3A in the cold and concentric position.

As can be seen, for circular risers, the Eccentricity is at 0% when the upper and lower risers are completely concentric and at 100% when the upper and lower risers are completely eccentric (i.e., in contact). This definition of eccentricity is the same as referenced in U.S. Pat. No. 4,588,558 to Kam et al.

Continuing with the discussion above, it is believed that this flow disruption experienced when the eccentricity is greater than about 10% is caused in part by the upward moving catalyst from the lower riser section impinging on the cone of the upper riser section. The moving catalyst then loses momentum and can easily fall out of the riser disengaging zone. Additionally, it is believed that the flow pattern of the vent gas and entrained catalyst from the dilute phase area of the reactor entering the disengaging zone is severely altered in its course by the abrupt cone wall angle, again causing low and/or tangential velocities in the area of the disengaging zone thus "breaking the seal" of the vent gas and again allowing catalyst and hydrocarbons to escape from the disengaging area into the dilute phase zone of the FCC reactor. It should be noted that this design and operation of the prior art not only results in severe backmixing when the eccentricity is greater than about 10%, but also results in severe impingement of the catalyst on the riser equipment which will result in significant erosion damage unless mitigated.

Figure 8A:
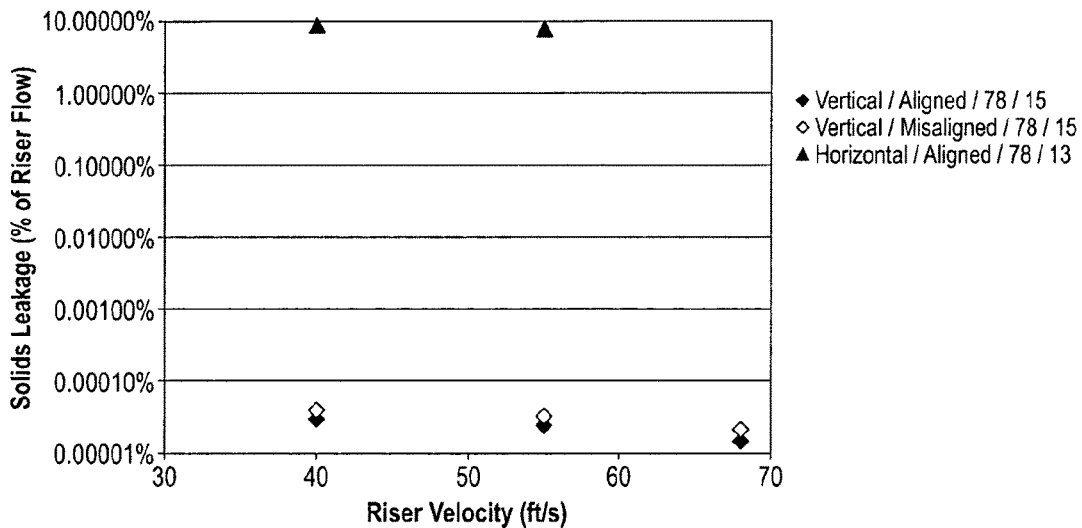
FIG. 8A compares the amount of Solids Leakage (catalyst) from the disengaging zone of the prior art cold flow testing and the present invention cold flow testing as a function of riser velocities.
Figure 8B:
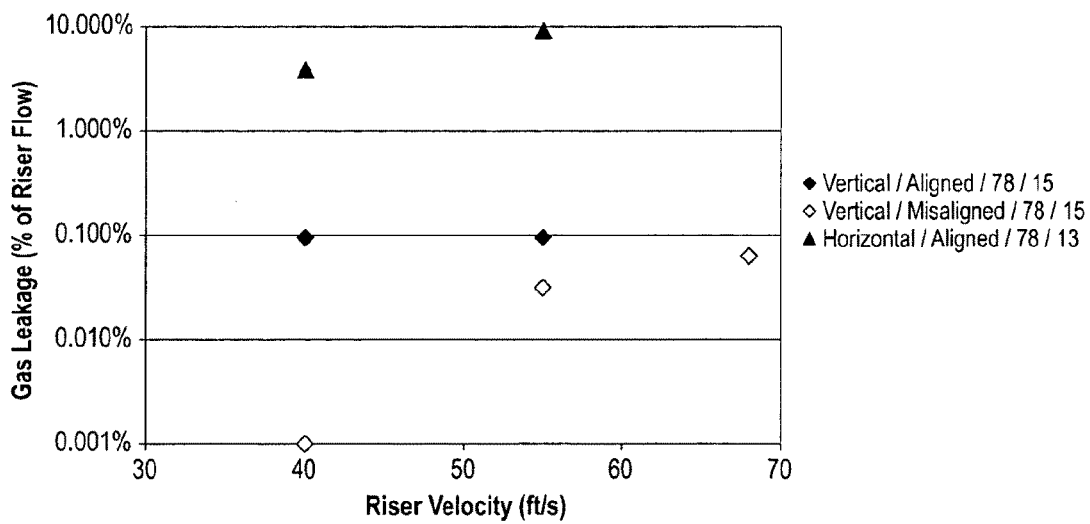
FIG. 8B compares the amount of Gas Leakage (hydrocarbons) from the disengaging zone of the prior art cold flow testing and the present invention cold flow testing as a function of riser velocities.

In order to verify and quantify the benefits of the present invention, cold flow tests were performed as discussed in the Example herein for similar prior art and present invention configurations. Cold flow test models were made for 1) a short contact-time FCC internal riser reactor process utilizing the disengaging zones of the prior art located between the reactor riser and the primary cyclones (similar to as shown in FIGS. 1, 8A, and 8B) and 2) a short contact-time FCC internal riser reactor process utilizing the segregated upper riser and lower riser configuration and sealed riser/cyclone arrangement of the present invention (similar to as shown in FIGS. 2, 3A, 3B, 4, 9A and 9B). It should be noted that in these cold flow tests, the design of the present invention was compared to the closest commercial prior art as illustrated in FIG. 1 herein, not the Krambeck/Kam designs, as the Krambeck/Kam designs, for reasons as discussed in the Background as well as the Details of the Invention sections herein, are not commercially used or viable.

Figure 6A:
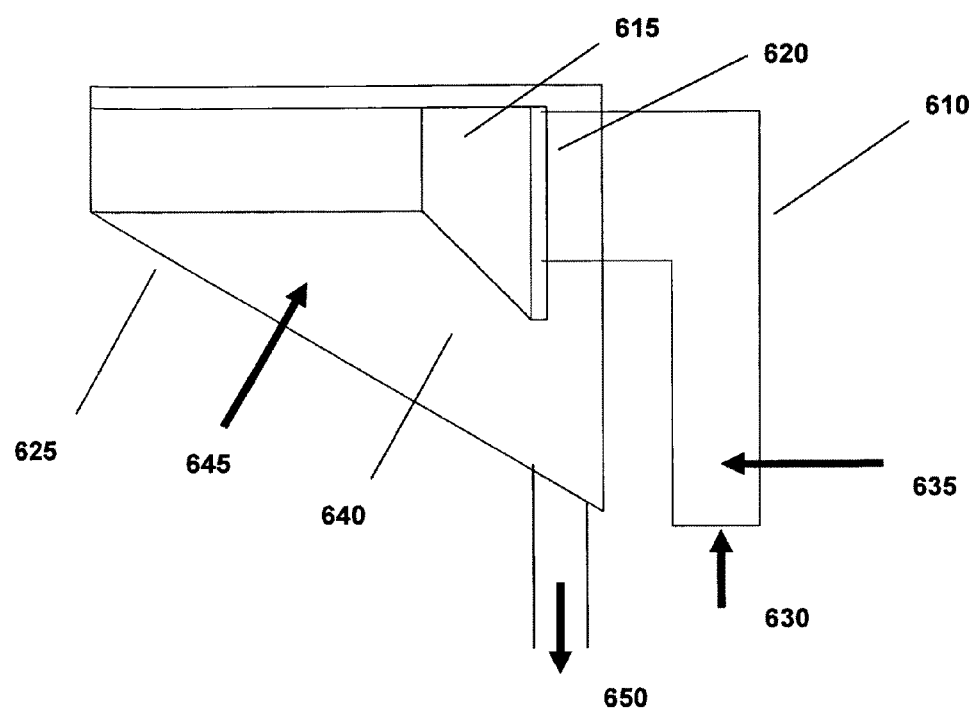
FIG. 6A shows a general schematic configuration for the cold flow testing apparatus of the prior art as described in the Example.
Figure 6B:
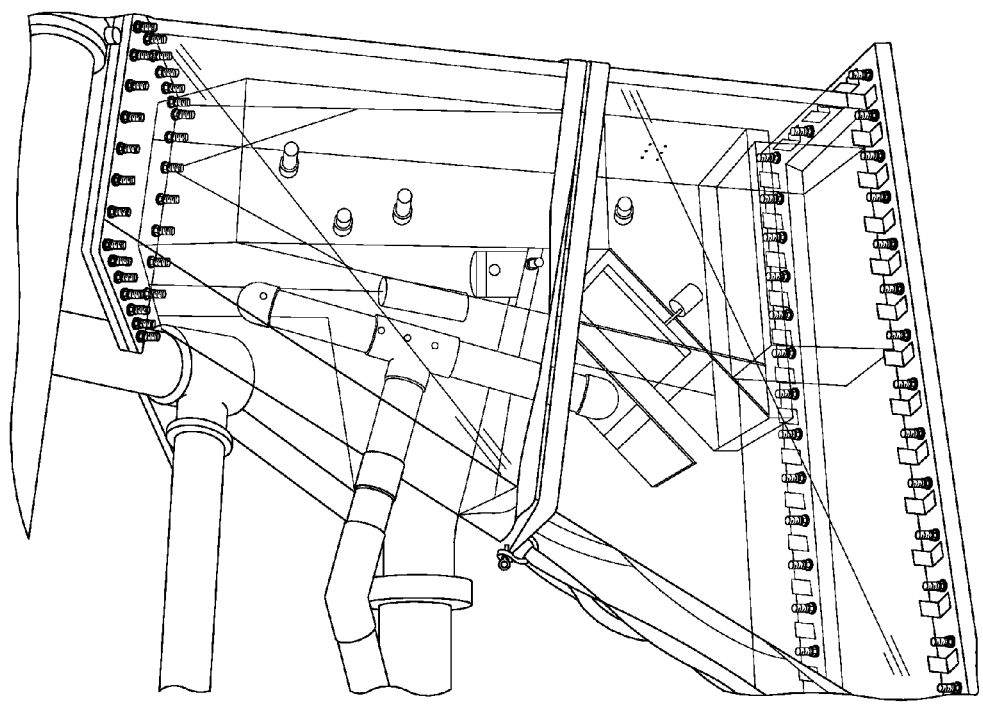
FIG. 6B shows a photograph of the cold flow testing apparatus of the prior art as described in the Example.
Figure 7A:
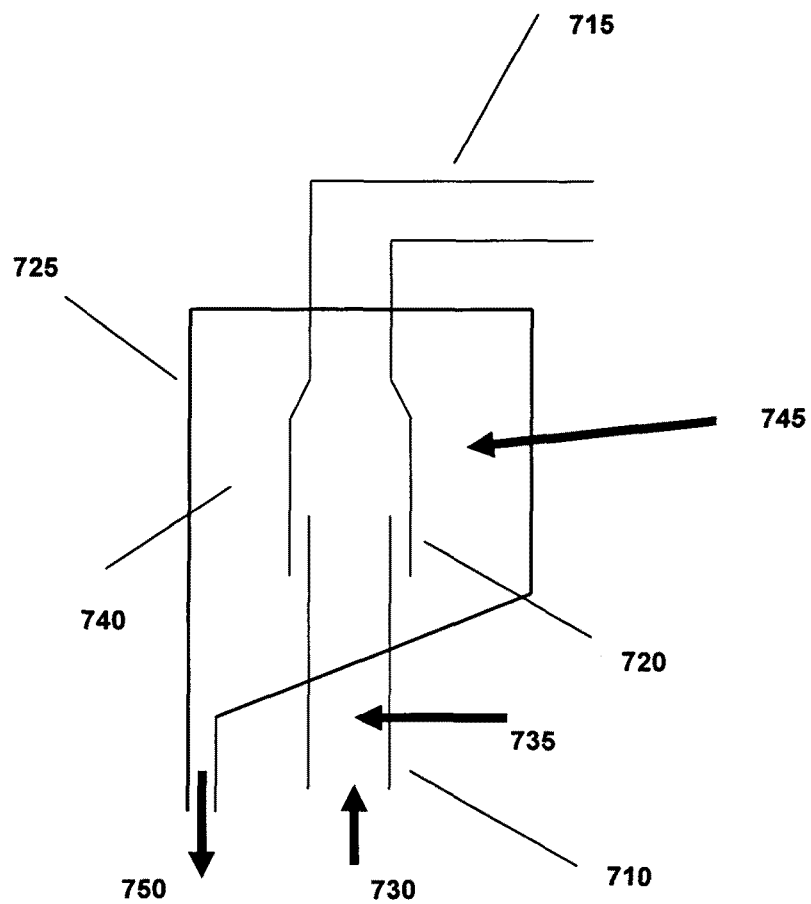
FIG. 7A shows a general schematic configuration for the cold flow testing apparatus of an embodiment of the present invention as described in the Example.

These cold flow tests not only allowed the inventors to visualize and measure the losses under physical conditions, but also allowed the inventors to run the present invention design under "misaligned" conditions to test that the present invention truly rectified the misalignment problems associated with the prior art Krambeck and Kam designs. The general schematic configuration for the cold flow testing of the prior art is shown in FIG. 6A, while the actual cold flow unit for the prior art configuration is shown in a photograph n FIG. 6B. The general schematic configuration for the cold flow testing of the present invention is shown in FIG. 7A, while the actual cold flow unit of an embodiment of the present invention is shown in a photograph n FIG. 7B. The details of the conditions under which the cold flow tests were performed are detailed in the Example, and the results are summarized here.

FIGS. 8A and 8B show the results of testing of both the prior art and the present invention under "aligned" conditions as well as the present invention under "misaligned" conditions at different riser velocities. FIG. 8A shows the amount of Solids Leakage (catalyst) from the disengaging zones as a function of riser velocities, while FIG. 8B shows the amount of Gas Leakage (hydrocarbons) from the disengaging zones as a function of riser velocities. First, it can be seen in FIG. 8A, that in the present invention "aligned configuration" the Solids Leakage was reduced by about 5 orders of magnitude, or a staggering >99.999% (please note that the graphs in the Examples are in exponential scales).

Even more unexpectedly, the present invention showed almost no difference in catalyst losses between the aligned and misaligned cases. It should be noted herein that in all of the cold flow tests, the "misaligned" test case was run at the most severely misaligned conditions of 100% eccentricity (i.e., wherein the lower riser actually was in contact with the sleeve of the upper riser).

Not quite as startling, but very significant, as shown in FIG. 8B, the Gas Leakage rates for the aligned case of the present invention were in the range of about 1 to 2% of the Gas Leakage rates of the prior art. Additionally, the present invention generally performed as well or better for minimizing gas leakage in the "misaligned" condition.

Figure 9A:
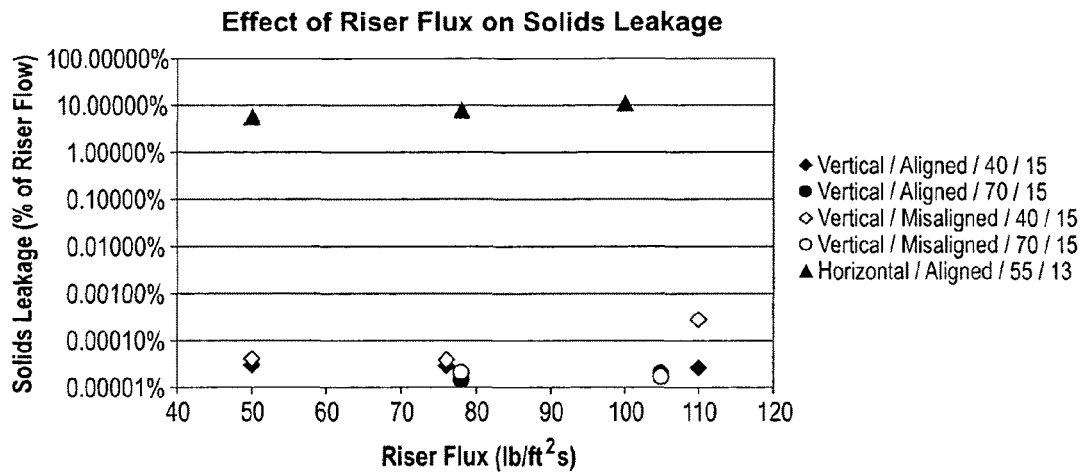
FIG. 9A compares the amount of Solids Leakage (catalyst) from the disengaging zone of the prior art cold flow testing and the present invention cold flow testing as a function of the riser flux rates.
Figure 9B:
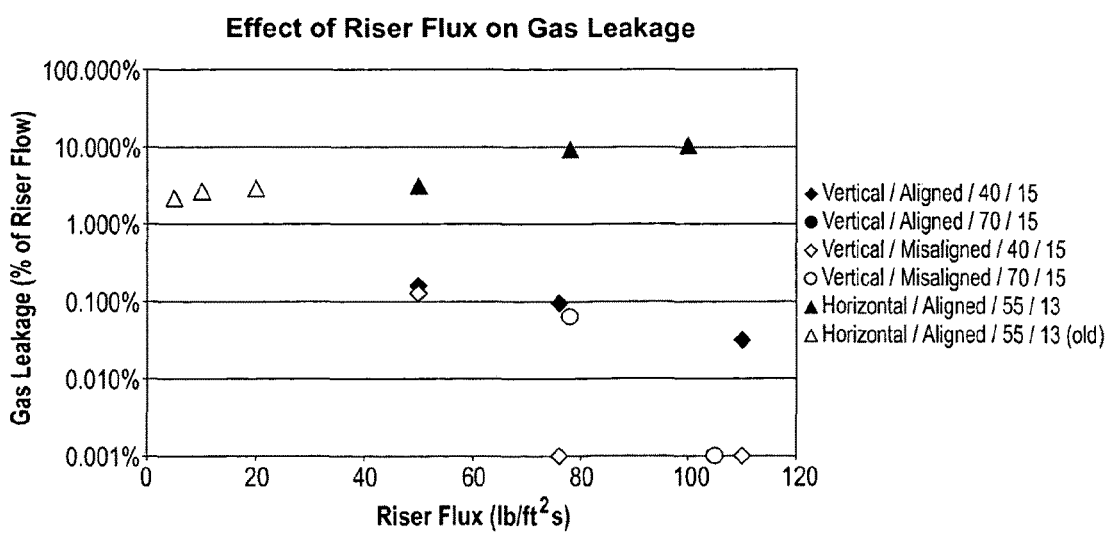
FIG. 9B compares the amount of Gas Leakage (hydrocarbons) from the disengaging zone of the prior art cold flow testing and the present invention cold flow testing as a function of the riser flux rates.

FIGS. 9A and 9B show the results of testing of both the prior art and the present invention under "aligned" conditions as well as the present invention under "misaligned" conditions at different riser flux rates. The riser flux rates are a measure of the catalyst mass flow rates through the riser. FIG. 9A shows the amount of Solids Leakage (catalyst) from the disengaging zones as a function of riser flux rates, while FIG. 9B shows the amount of Gas Leakage (hydrocarbons) from the disengaging zones as a function of riser flux rates. It can be seen from FIGS. 9A and 9B, that similar magnitudes of improved performance in mitigating both solids leakage and gas leakage are shown by the performance of the present invention as compared to the prior art when measured as a function of the riser flux rates. Additionally, performance of the present invention in both the "aligned" and "misaligned" conditions (i.e., eccentricity of 100% in misaligned conditions) was fairly similar and vastly improved in both conditions over the prior art.

Figure 10A:
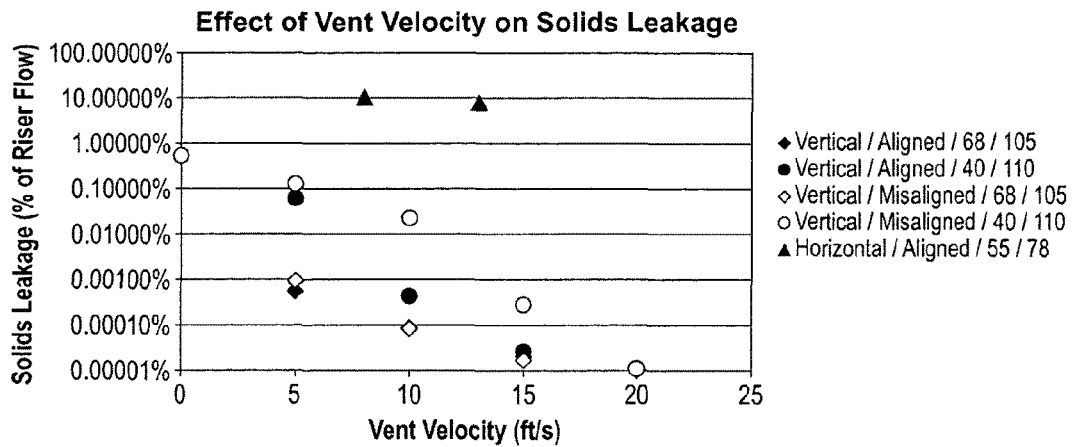
FIG. 10A compares the amount of Solids Leakage (catalyst) from the disengaging zone of the prior art cold flow testing and the present invention cold flow testing as a function of the vent velocities.
Figure 10B:
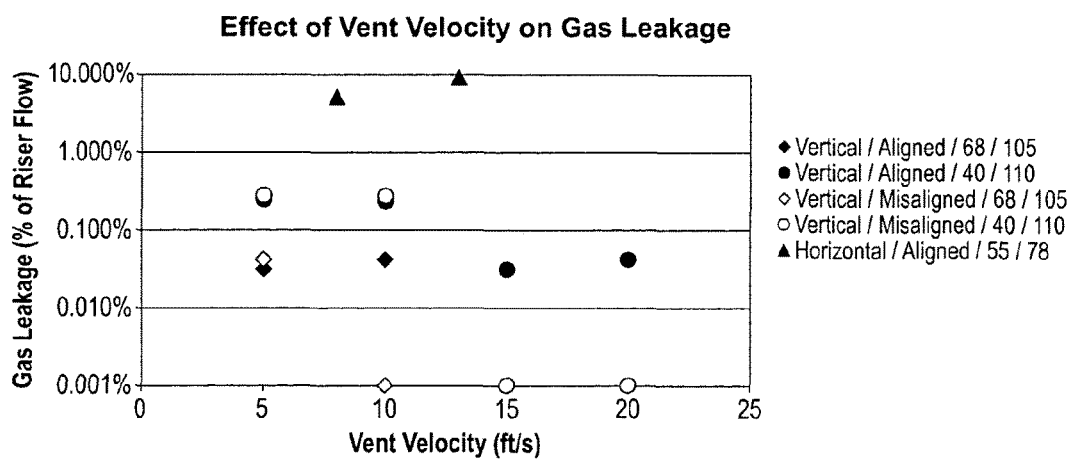
FIG. 10B compares the amount of Gas Leakage (hydrocarbons) from the disengaging zone of the prior art cold flow testing and the present invention cold flow testing as a function of the vent velocities.

The last figures from the cold flow experiments of the Example herein are shown in FIGS. 10A and 10B herein. FIGS. 10A and 10B show the results of testing of both the prior art and the present invention under "aligned" conditions as well as the present invention under "misaligned" conditions at different vent velocities. In FIG. 10A the amount of Solids Leakage (catalyst) from the disengaging zones is shown as a function of vent velocities, while in FIG. 10B the amount of Gas Leakage (hydrocarbons) from the disengaging zones is shown as a function of riser flux rates. The "vent velocities" (or "vent gas velocities") are the velocities of the "vent gas" that is the gas moving from the area surrounding the disengaging zone, as calculated at the velocities as it moves through the disengaging zone and into the primary cyclone conduit (as in prior art) or into the riser (as in the present invention). The vent velocity is measured as the volumetric flow rate of the vent gas into the test facility divided by the cross sections area of the annular gap area, as shown as area (301) in FIG. 3B.

FIGS. 10A and 10B again show the significant improvement of the present invention over the prior art even at differing vent velocities and catalyst mass flux rates ("$U_g$"). As can be seen in FIG. 10A, at most vent velocities, the Solids Leakage rates from the present invention are less than about 1% of the Solids Leakage rates of the prior art under most conditions. There are also significant improvements shown in the Gas Leakage rates in FIG. 10B. Also what was unexpectedly discovered is that at vent gas velocities at or above about 10 ft/sec, the leakage rates were significantly improved. This is even more evident from the data at vent gas velocities at or above about 15 ft/sec. Also, as can be seen from FIGS. 10A and 10B, higher riser catalyst flux rate, especially above about 40 lb/ft$^2$-s led to improved reductions in both solids and gas leakage rates.

Based on these unexpected results, in a preferred embodiments of the present invention, the "transition length" (as shown in FIG. 3A) is preferably from about 6 to about 36 inches, more preferably from about 6 to about 24 inches when the unit is in the hot (i.e., operating) condition. In preferred embodiments of the present invention, the angle of the cone section, as shown by cone angle ($\alpha$) in FIG. 3A should be between 5° and 25°, more preferably from about 5° and 20°, and even more preferably, from about 5° and 15°, from the axis of the riser. Along with the dimensions above, the choice of angle is important as it impacts riser wall erosion and catalyst flow behavior. It should also be noted that the overlap length and transition region length for a particular embodiment may be dependent upon design factors such as, but not limited to, riser diameter, feedstream rates, catalyst rates, operating temperatures, operating pressures, and reactor severity. Additionally, a smaller cone angle can be utilized in conjunction with shorter transition lengths to improve performance. One of skill in the art may design the proper geometry of the present invention for a particular application based on modeling tools available in the industry.

Additionally, in some instances, it may be desirable to maintain the same overall superficial vapor velocity in the upper and lower riser sections of the present invention. In a preferred embodiment of the present invention, the upper riser section has a larger internal diameter (or cross sectional area if not circular in cross-section) than the lower riser section to allow for the added steam, hydrocarbons, or other material flowing through the annular gap into the upper riser section. The cross-sectional area of the annular gap of the present invention should be designed such that the vent velocity within the annular gap is greater than about 10 ft/sec and even more preferably, greater than about 15 ft/sec. The preferred range for the vent velocity in the present invention is from about 5 to about 35 ft/sec, more preferably from about 10 to about 30 ft/sec, and most preferably from about 15 to about 25 ft/sec. This calculation should be based on the expected flow rate of stripping steam entering the annular gap.

During operating conditions of the present invention, the riser is operated at a similar pressure as the dilute phase area of the reactor. As such, the annular gap is controlled so as to allow the volatile hydrocarbons and steam from the dilute phase area of the reactor to enter the riser and be removed through the reactor cyclones. As discussed prior, it has been unexpectedly been discovered that under proper operating conditions, that virtually none of the hydrocarbon feedstream and/or catalyst will migrate from reactor riser to the dilute phase area of the reactor via the riser's annular gap area in the present invention.

Another significant benefit of the present invention with respect to the prior art configuration of the close-coupled cyclones as shown in FIG. 1 is that the disengaging zones of the prior art are difficult to field install. The final designs of the prior art often have to make a compromise between the optimum mechanical and process designs, resulting in a design that is not optimally efficient for either installation or operation. A benefit of the segregated riser of the present invention is that the problems surrounding fabrication and installation of these disengaging zones, as well as the operational deficiencies associated with the prior art, are eliminated.

The problems that the prior art poses in obtaining proper fit-up, equipment installation and maintenance, as well as the difficulty in maintaining proper annular gaps can be illustrated referencing the prior art schematic in FIG. 1. Due to the high temperatures to which the associated equipment is subjected, the internal riser (5) must be able to thermally expand and move independently from the primary cyclone (20). Since the primary cyclones (20) are attached to the top of the FCC reactor (1) and the internal reactor riser (5) is attached to the bottom of the FCC reactor (1), these components tend to move in opposite directions. This is further exasperated by the fact that the total growth of the reactor riser must be accounted for in thermal clearances. Due to these large lengths and high thermal expansion (FCC reactors generally operate from about 950 to 1250° F.), excessive clearances in the disengaging zone (70) must be addressed by design. This contributes to poor capture and control of the cracked hydrocarbon products and spent catalysts from the reactor riser and can lead to excessive coking in the area of the disengaging zone (70) as well as resulting mechanical compromise.

Additionally, this overlap in the primary cyclone inlet conduit in the area of the disengaging zone (70) and the tight three-dimensional tolerances required in this design require that much of the internals of the FCC Reactor be fitted and installed in the field. This directly increases overall costs as well as lengthening reactor down times for repairs and retrofits.

In stark contrast, the present invention is a design wherein the upper riser is connected to the top of the FCC reactor in conjunction with the primary and secondary cyclones. In this design, since these associated components move in unison, significantly less field fitting is required to install the reactor internals of the present design as compared with the prior art close-coupled cyclone designs. In the present invention, the entire upper riser, primary cyclones and secondary cyclones arrangement can be pre-attached to the head (top) of an FCC reactor. The old FCC reactor head can be removed and the new design components "lowered in" with very little field work as compared to the prior art. This novel design can save both field construction time as well operational downtime of existing FCC units resulting in considerable savings.

Figure 4:
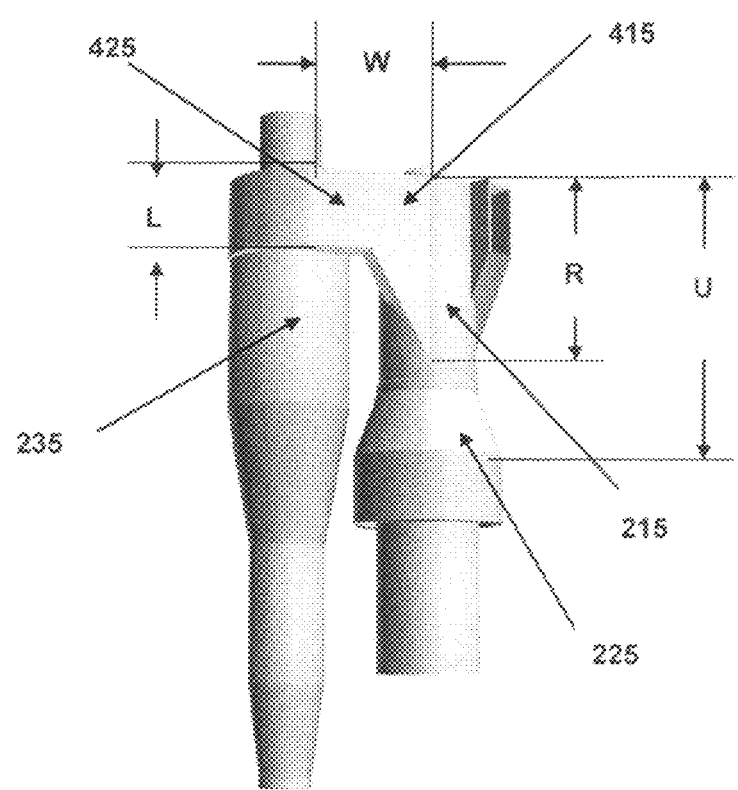
FIG. 4 illustrates an embodiment of the internal upper riser and lower riser design of the present invention in conjunction with one of the primary cyclones illustrating preferred locations and dimensions of some of the components of the present invention.

As discussed, the present invention allows the reactor riser, primary cyclones, and secondary cyclones to be installed together in a modular manner. In other words, no disengaging zones (and associated field fit-up with the associated cyclones and riser) are required in the present invention between either the reactor riser and the primary cyclones, or between the primary cyclones and the secondary cyclones. As a result, the conduit section between the riser outlet and the primary cyclone can now be fixed. FIG. 4 illustrates a preferred embodiment of the riser outlet/primary cyclone inlet connection of the present invention. FIG. 4 shows a preferred embodiment of the upper riser (215) and the upper riser outlet (415) as well as the primary cyclone (235) and the primary cyclone inlet (425) of the present invention. In a preferred embodiment, the height of the riser reactor outlet, "R", is from about 1.0 to about 2.0 times the height of the primary cyclone inlet, "L". In a more preferred embodiment, the height of the riser reactor outlet, "R", is from about 1.5 to about 2.0 times the height of the primary cyclone inlet, "L".

Returning to FIG. 4, in a more preferred embodiment of the present invention, the height ("U") of the upper riser from the top of the riser outlet (415) to the bottom of the cone (225) is from about 3 to about 6 times the primary cyclone inlet height ("L"). In a most preferred embodiment, the height ("U") is from about 3 to about 5 times the primary cyclone inlet height ("L"). In yet another preferred embodiment, the length of the conduit (designated as "W" in FIG. 4) connecting the upper reactor riser (215) to the primary cyclone (235) is from about 1.5 to about 3 times the primary cyclone inlet height ("L"). More preferably, the length of the conduit (designated as "W" in FIG. 4) connecting the upper reactor riser (215) to the primary cyclone (235) is from about 1.5 to about 2.5 times the primary cyclone inlet height ("L"). It should be noted that the length "W" is as measured in a plane orthogonal to the axis of the reactor riser on a line along the centerline of the conduit from the outer diameter of the upper reactor riser (215) to the outer diameter of the primary cyclone (235).

Figure 5:
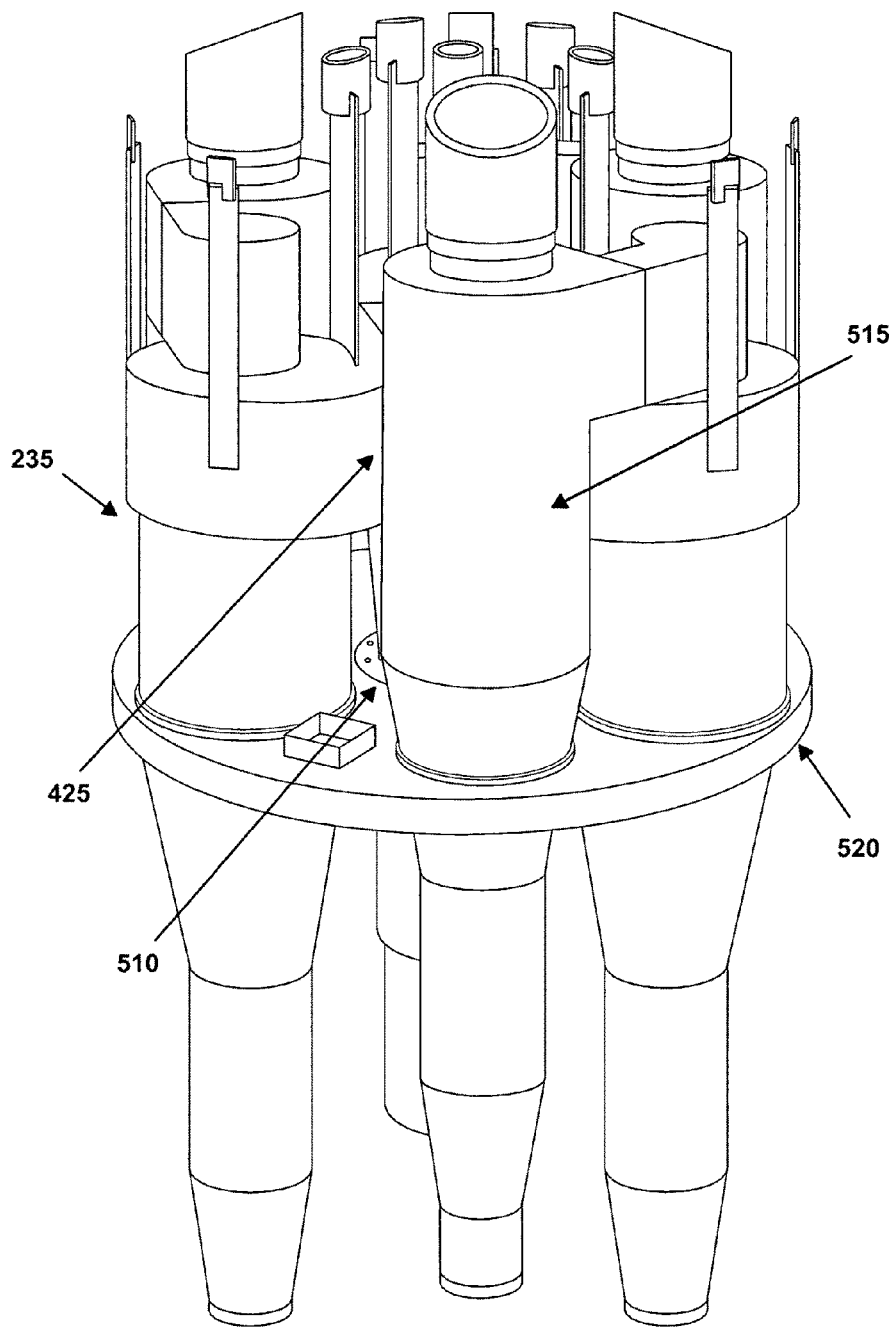
FIG. 5 illustrates a preferred embodiment of the present invention wherein an anti-coking baffle is located below the inlet of the primary cyclones. This figure also shows one embodiment of the present invention in a configuration of a single riser terminating to three sets of primary/secondary cyclones.

In another preferred embodiment of the present invention an anti-coking baffle is installed in the FCC reactor below the primary cyclone inlet. FIG. 5 herein shows this embodiment of the present invention wherein the anti-coking baffle is installed in the FCC reactor below the primary cyclone inlet. In preferred embodiments, the top of the anti-coking baffle is at a distance of at least two times the height of the primary cyclone inlet (shown as dimension "L" in FIG. 4) from the top of the primary cyclone inlet. FIG. 5 illustrates a FCC reactor design incorporating many of the embodiments of the present invention. FIG. 5 illustrates a design with three primary cyclones (235) and three secondary cyclones (515) attached to a single upper riser (obstructed from view, but located in the center of the assembly shown in FIG. 5). As can be seen from FIG. 5, the anti-coking baffle (520) is located below the primary cyclone inlet (425). In typical close-coupled cyclone designs of the prior art (as illustrated in the prior art of FIG. 1), the anti-coking baffle is located above the primary cyclones (the typical anti-coking baffle is not illustrated in FIG. 1). This made the installation and maintenance of the anti-coking baffle as well as the inspection of the related components (i.e., riser, cyclones, supports, etc.) very difficult. As can be seen from FIG. 5, the design of this embodiment of the present invention allows sufficient headroom above the anti-coking baffle for a person to walk upright in this section during installations and inspections. Additionally, this design provides much greater access to many of the critical inspection points such as the top of the internal riser, the primary and secondary cyclones and connecting conduits, as well as the supports for the riser/cyclone assembly.

Some of the benefits with lowering the anti-coking baffle in conjunction with other aspects of the present invention are as follows. Firstly, as can be seen in FIG. 5, virtually the entire reactor upper riser, primary cyclone, secondary cyclone, supports and anti-coking baffle can be pre-assembled as single unit for installation into an FCC reactor. As discussed prior, this new design reduces a significant amount of field fit-up and installation as well as equipment downtime. This new "modular" reactor design can be pre-fabricated and attached to a new reactor shell for "drop in" installation saving time and costs. It was noted before that the elimination of disengaging zones in the cyclones conduits reduced the amount of field fit-up required. Similarly, by moving the anti-coking baffle from above the primary cyclone to below the primary cyclone in the present design, much of the required field work for installation is eliminated. The lower anti-coking baffle provides much greater access to the top of the anti-coking baffle as well as to associated critical component areas that require access and inspection at regular intervals. Additionally, the lower anti-coking baffle placement reduces the volume of vessel internals that are exposed to escaping hydrocarbons and resulting coke formation, thereby reducing the time and cost associated with de-coking during unit turnarounds (maintenance intervals). This will also improve coke selectivity—resulting in improved process yields (favoring the production of more valuable products).

In a preferred embodiment of the present invention, the anti-coking baffle of the present invention includes holes and/or piping through the anti-coking baffle for the effective distribution of steam below the baffle apparatus to a concentric zone around the internal riser, which ideally deploys the steam/condensate adjacent to the central riser disengagement gap. The purpose of this design is to prevent coke formation from accumulating in the areas surrounding the annular gap. The steam is introduced by a plurality of open steam distribution holes and/or pipes (510) as shown located near the center of FIG. 5 (partially obstructed from view). The operating pressure above the apparatus is normally higher than below the baffle, which can provide a simple means of distributing the steam, without the need of introducing a complex discharge manifold and/or conduit system.

As part of the present invention, the equipment embodiments above are utilized in a process for fluid catalytically cracking a heavy hydrocarbon feed as defined above. In this process, the heavy hydrocarbon feed is conducted to a short contact-time FCC reactor. The heavy hydrocarbon feed is injected through one or more feed nozzles into a reactor riser. Within this reactor riser, the heavy hydrocarbon feed is contacted with a catalytic cracking catalyst under cracking conditions thereby resulting in spent catalyst particles containing carbon deposited thereon and a lower boiling product stream. The cracking conditions are conventional and will typically include: temperatures from about 932° F. to about 1040° F. (500° C. to 560° C.), preferably about 977° F. to about 1004° F. (525 to 540° C.); hydrocarbon partial pressures from about 10 to 50. psia (70-345 kPa), preferably from about 20 to 40 psia (140-275 kPa); and a catalyst to feed (wt/wt) ratio from about 3 to 8, preferably about 5 to 6, where the catalyst weight is total weight of the catalyst composite. Steam may be concurrently introduced with the feed into the reaction zone. The steam may comprise up to about 5 wt % of the feed. Preferably, the FCC feed residence time in the reaction zone is less than about 5 seconds, more preferably from about 3 to 5 seconds, and even more preferably from about 2 to 3 seconds.

Catalysts suitable for use herein are cracking catalysts comprising either a large-pore molecular sieve or a mixture of at least one large-pore molecular sieve catalyst and at least one medium-pore molecular sieve catalyst. Large-pore molecular sieves suitable for use herein can be any molecular sieve catalyst having an average pore diameter greater than 0.7 nm which are typically used to catalytically "crack" hydrocarbon feeds. It is preferred that both the large-pore molecular sieves and the medium-pore molecular sieves used herein be selected from those molecular sieves having a crystalline tetrahedral framework oxide component. Preferably, the crystalline tetrahedral framework oxide component is selected from the group consisting of zeolites, tectosilicates, tetrahedral aluminophosphates (ALPOs) and tetrahedral silicoaluminophosphates (SAPOs). More preferably, the crystalline framework oxide component of both the large-pore and medium-pore catalyst is a zeolite. It should be noted that when the cracking catalyst comprises a mixture of at least one large-pore molecular sieve catalyst and at least one medium-pore molecular sieve, the large-pore component is typically used to catalyze the breakdown of primary products from the catalytic cracking reaction into clean products such as naphtha for fuels and olefins for chemical feedstocks.

Large pore molecular sieves that are typically used in commercial FCC process units are also suitable for use herein. FCC units used commercially generally employ conventional cracking catalysts which include large-pore zeolites such as USY or REY. Additional large pore molecular sieves that can be employed in accordance with the present invention include both natural and synthetic large pore zeolites. Non-limiting examples of natural large-pore zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, and ferrierite. Non-limiting examples of synthetic large pore zeolites are zeolites X, Y, A, L. ZK-4, ZK-5, B, E, F, H, J, M, Q, T, W, Z, alpha and beta, omega, REY and USY zeolites. It is preferred that the large pore molecular sieves used herein be selected from large pore zeolites. The more preferred large-pore zeolites for use herein are the faujasites, particularly zeolite Y, USY, and REY.

Medium-pore size molecular sieves that are suitable for use herein include both medium pore zeolites and silicoaluminophosphates (SAPOs). Medium pore zeolites suitable for use in the practice of the present invention are described in "Atlas of Zeolite Structure Types", eds. W. H. Meier and D. H. Olson, Butterworth-Heineman, Third Edition, 1992, which is hereby incorporated by reference. The medium-pore size zeolites generally have an average pore diameter less than about 0.7 nm, typically from about 0.5 to about 0.7 nm and includes for example, MFI, MFS, MEL, MTW, EUO, MTT, HEU, FER, and TON structure type zeolites (IUPAC Commission of Zeolite Nomenclature). Non-limiting examples of such medium-pore size zeolites, include ZSM-5, ZSM-12, ZSM-22, ZSM-23, ZSM-34, ZSM-35, ZSM-38, ZSM-48, ZSM-50, silicalite, and silicalite 2. The most preferred medium pore zeolite used in the present invention is ZSM-5, which is described in U.S. Pat. Nos. 3,702,886 and 3,770,614. ZSM-11 is described in U.S. Pat. No. 3,709,979; ZSM-12 in U.S. Pat. No. 3,832,449; ZSM-21 and ZSM-38 in U.S. Pat. No. 3,948,758; ZSM-23 in U.S. Pat. No. 4,076,842; and ZSM-35 in U.S. Pat. No. 4,016,245. As mentioned above SAPOs, such as SAPO-11, SAPO-34, SAPO-41, and SAPO-42, which are described in U.S. Pat. No. 4,440,871 can also be used herein. Non-limiting examples of other medium pore molecular sieves that can be used herein are chromosilicates; gallium silicates; iron silicates; aluminum phosphates (ALPO), such as ALPO-11 described in U.S. Pat. No. 4,310,440; titanium aluminosilicates (TASO), such as TASO-45 described in EP-A No. 229,295; boron silicates, described in U.S. Pat. No. 4,254,297; titanium aluminophosphates (TAPO), such as TAPO-11 described in U.S. Pat. No. 4,500,651; and iron aluminosilicates. All of the above patents are incorporated herein by reference.

The medium-pore size zeolites used herein can also include "crystalline admixtures" which are thought to be the result of faults occurring within the crystal or crystalline area during the synthesis of the zeolites. Examples of crystalline admixtures of ZSM-5 and ZSM-11 are disclosed in U.S. Pat. No. 4,229,424 which is incorporated herein by reference. The crystalline admixtures are themselves medium-pore size zeolites and are not to be confused with physical admixtures of zeolites in which distinct crystals of crystallites of different zeolites are physically present in the same catalyst composite or hydrothermal reaction mixtures.

The large-pore and medium-pore catalysts of the present invention will typically be present in an inorganic oxide matrix component that binds the catalyst components together so that the catalyst product is hard enough to survive inter-particle and reactor wall collisions. The inorganic oxide matrix can be made from an inorganic oxide sol or gel which is dried to "glue" the catalyst components together. Preferably, the inorganic oxide matrix will be comprised of oxides of silicon and aluminum. It is also preferred that separate alumina phases be incorporated into the inorganic oxide matrix. Species of aluminum oxyhydroxides-γ-alumina, boehmite, diaspore, and transitional aluminas such as α-alumina, β-alumina, γ-alumina, δ-alumina, ε-alumina, κ-alumina, and ρ-alumina can be employed. Preferably, the alumina species is an aluminum trihydroxide such as gibbsite, bayerite, nordstrandite, or doyelite. The matrix material may also contain phosphorous or aluminum phosphate. It is within the scope of this invention that the large-pore catalysts and medium-pore catalysts be present in the same or different catalyst particles, in the aforesaid inorganic oxide matrix.

As mentioned above, the contacting of the heavy hydrocarbon feed with the cracking catalyst results in spent catalyst particles containing carbon deposited thereon and a lower boiling product stream. The majority of, and preferably substantially all of, the spent catalyst particles are conducted to a stripping zone in the FCC reactor. The stripping zone will typically contain a dense bed (or "dense phase") of catalyst particles where stripping of volatiles takes place by use of a stripping agent such as steam. There will also be space above the stripping zone wherein the catalyst density is substantially lower and which space can be referred to as a "dilute phase".

The majority of, and preferably substantially all of, the stripped catalyst particles are subsequently conducted to a regeneration zone wherein the spent catalyst particles are regenerated by burning coke from the spent catalyst particles in the presence of an oxygen containing gas, preferably air thus producing regenerated catalyst particles. This regeneration step restores catalyst activity and simultaneously heats the catalyst to a temperature from about 1202° F. (650° C.) to about 1382° F. (750° C.). The majority of, and preferably substantially all of, the hot regenerated catalyst particles are then recycled to the FCC reaction zone where they contact injected FCC feed.

As noted prior, the contacting of the heavy hydrocarbon feed with the cracking catalyst also results in a FCC reactor overhead product stream. In preferred embodiments of the present invention, at least a portion of the FCC reactor overhead product stream is further separated into a least a naphtha stream and a distillate stream for use in producing liquid fuel products.

The following example is presented for illustrative purposes only and is not to be taken as limiting the present invention in any way.

EXAMPLE

Figure 7B:
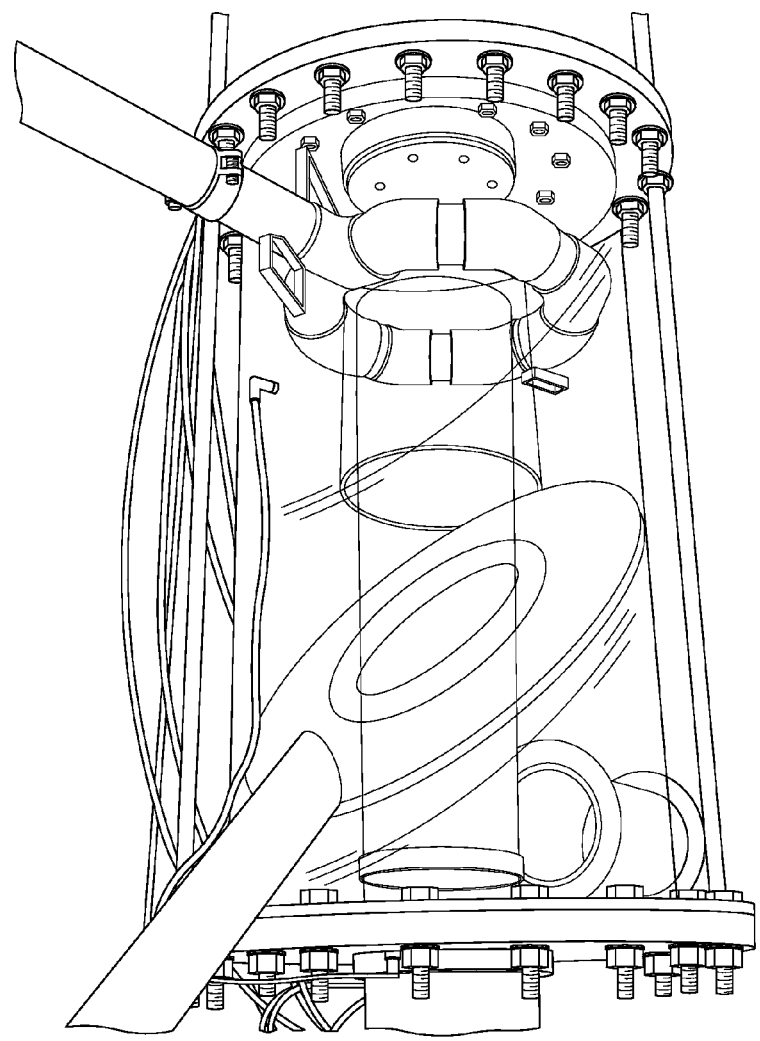
FIG. 7B shows a photograph of the cold flow testing apparatus of an embodiment of the present invention as described in the Example.

In this Example, extensive cold flow testing of the current invention and the prior art was performed. This testing consisted of running see-through plexiglass models of both the prior art, wherein the disengaging zone is in the conduit between the riser and the primary conduits, and a preferred embodiment of the present invention configurations at scaled sizes and operating conditions using air in place of hydrocarbons and steam. Gas escaping through the vents was measured with helium tracers and probes. Catalyst escaping through the vent was collected and weighed. A diagram of the setup of the cold flow test facility of the prior art design is shown in FIG. 6A, while a picture of this cold flow test facility that was utilized is shown in FIG. 6B. A diagram of the setup of the cold flow test facility of a preferred embodiment of the present invention is shown in FIG. 7A, while a picture of this cold flow test facility that was utilized is shown in FIG. 7B.

It should be noted that in these cold flow tests, the design of the present invention was compared to the closest commercial prior art as illustrated in FIG. 1 herein, not the Krambeck/Kam designs, as the Krambeck/Kam designs, for reasons as discussed in the Background as well as the Details of the Invention sections herein, are not commercially used or viable. However, it should also be noted that in the cold flow tests described in this Example, the new design of the current invention was tested in severely misaligned positions and it was discovered that the current invention overcomes the deficiencies of the prior art Krambeck/Kam designs when the upper and lower risers are in the misaligned positions. These experiments indicated a significant decrease in hydrocarbon loss (as indicated by helium tracer measurements) and a significant decrease in catalyst losses for the present invention, as compared to the prior art design wherein the disengaging zone is in the conduit between the riser and the primary conduits. The comparative data from the tests in this Example as shown in FIGS. 8A, 8B, 9A, 9B, 10A, and 10B illustrate the significant and surprising improvements in the process results of the present invention relative to the prior art.

The cold flow tests were performed for the prior art and the present invention configurations. This not only allowed the inventors to visualize the and measure the losses under actual conditions, but also allowed the inventors to run the present invention design under "misaligned" conditions to test that the present problem truly rectified the misalignment problems associated with the prior art Krambeck and Kam designs. The general schematic configuration for the cold flow testing of the prior art is shown in FIG. 6A, while the actual cold flow unit for the prior art configuration is shown in a photograph in FIG. 6B. The general schematic configuration for the cold flow testing of the present invention is shown in FIG. 6A, while the actual cold flow unit of an embodiment of the present invention is shown in a photograph in FIG. 6B.

The cold flow testing apparatus for a scaled version of the prior art configuration is shown schematically in FIG. 6A. The apparatus consisted of a riser (610) which was connected to primary cyclone intake (615) by a disengaging zone (620) of the prior art. The disengaging zone was entirely encapsulated in an airtight plexiglass housing (625). Catalyst was fluidized with air (630) and entered the riser (610). A helium tracer (635) was injected into the riser and the amount of helium tracer was monitored (640) inside the plexiglass housing to quantify leakage from the disengaging zone (620). During the test, air (645) was pumped into the plexiglass area at measured flow rates, which acted as a "vent gas" in the cold flow testing. Catalyst lost from the disengaging zone was collected from the plexiglass enclosure via port (650) and quantified.

In a similar arrangement, the cold flow testing apparatus of a scaled version of a preferred embodiment of the present invention is shown schematically in FIG. 7A. The apparatus consisted of a lower riser (710) which was connected to the upper riser (715) by a disengaging zone configuration (720) of the present invention. The disengaging zone was entirely encapsulated in an airtight plexiglass housing (725). Catalyst was fluidized with air (730) and entered the riser (710). A helium tracer (735) was injected into the lower riser and the amount of helium tracer was monitored (740) inside the plexiglass housing to quantify leakage from the disengaging zone (720). During the test, air (745) was pumped into the plexiglass area at measured flow rates, which acted as a "vent gas" in the cold flow testing. Catalyst lost from the disengaging zone was collected from the plexiglass enclosure via port (750) and quantified.

For cold flow experimental configurations of both the prior art and present invention simulations, the riser was 8 inches diameter. For both simulations, the riser terminated in a 90 degree elbow at the top with the location of the vent being the key difference between the two configurations as described above. In the cold flow experiments, several key parameters were varied to reflect typical commercial operating conditions. Catalyst fluxes were varied from 50-105 $lb/ft^2$-s. Riser velocities were varied from 40-68 ft/s. Vent velocities were varied from 0-20 ft/s. For the cold flow simulation of the present invention, the cone angle was set to 18 degrees, the transition length was 12 inches, the overlap was 12 inches, the upper riser diameter was the same as the lower riser diameter at 8 inches, and the gap in the riser vent was 2 inches. When the present invention was simulated in a misaligned state, eccentricity was 100% so that the outer diameter of the lower riser was in contact with the inner diameter of the sleeve.

FIGS. 8A and 8B show the results of testing of both the prior art and the present invention under "aligned" conditions as well as the present invention under "misaligned" conditions at different riser velocities. FIG. 8A shows the amount of Solids Leakage (catalyst) from the disengaging zones as a function of riser velocities, while FIG. 8B shows the amount of Gas Leakage (hydrocarbons) from the disengaging zones as a function of riser velocities. First, it can be seen in FIG. 8A, that in the present invention "aligned configuration" the Solids Leakage was reduced by about 5 orders of magnitude, or a staggering >99.999% (graphs on exponential scales). Even more unexpectedly, the present invention showed almost no difference in catalyst losses between the aligned and misaligned cases. Not quite as startling, but very significant, as shown in FIG. 8B, the Gas Leakage rates for the aligned case of the present invention were about in the range of about 1 to 2% of the Gas Leakage rates of the prior art. Additionally, the present invention performed as well or better for minimizing gas leakage in the "misaligned" condition.

FIGS. 9A and 9B show the results of testing of both the prior art and the present invention under "aligned" conditions as well as the present invention under "misaligned" conditions at different riser flux rates. The riser flux rates are a measure of the catalyst mass flow rates through the riser. FIG. 9A shows the amount of Solids Leakage (catalyst) from the disengaging zones as a function of riser flux rates, while FIG. 9B shows the amount of Gas Leakage (hydrocarbons) from the disengaging zones as a function of riser flux rates. It can be seen from FIGS. 9A and 9B, that similar magnitudes of improved performance in mitigating both solids leakage and gas leakage are shown by the performance of the present invention as compared to the prior art when measured as a function of the riser flux rates. Additionally, performance of the present invention in both the "aligned" and "misaligned" conditions was fairly similar and vastly improved in both conditions over the prior art.

The last figures from the cold flow experiments of Example 2 are shown in FIGS. 10A and 10B herein. FIGS. 10A and 10B show the results of testing of both the prior art and the present invention under "aligned" conditions as well as the present invention under "misaligned" conditions at different vent velocities. In FIG. 10A the amount of Solids Leakage (catalyst) from the disengaging zones is shown as a function of vent velocities, while in FIG. 10B the amount of Gas Leakage (hydrocarbons) from the disengaging zones is shown as a function of riser flux rates. The "vent velocities" (or "vent gas velocities") are the velocities of the "vent gas" that is the gas moving from the area surrounding the disengaging zone, as calculated at the velocities as it moves through the disengaging zone and into the primary cyclone conduit (as in prior art) or into the riser (as in the present invention). The vent velocity is measured as the volumetric flow rate of the vent gas into the test facility divided by the cross sections are of the annular gap area, as shown as area (301) in FIG. 3A.

Again, FIGS. 10A and 10B show the significant improvement of the present invention over the prior art even at differing vent velocities and catalyst mass flux rates ("$U_g$"). Again, as can be seen in FIG. 10A, at most vent velocities, the Solids Leakage rates from the present invention are less than about 1% of the Solids Leakage rates of the prior art under most conditions. There are also significant improvements shown in the Gas Leakage rates in FIG. 10B. Also what was unexpectedly discovered is that at vent gas velocities at or above about 10 ft/sec, the leakage rates were significantly improved. This is even more evident from the data at vent gas velocities at or above about 15 ft/sec. Also, as can be seen from FIGS. 10A and 10B, higher riser flux rate, especially above about 40 lb/ft$^2$-s led to improved reductions in both solids and gas leakage rates.

The results of these experiments indicated that the current invention reduced catalyst losses by a significant amount as compared to the prior art. The experiments also indicated that the hydrocarbon losses are significantly lower in the present invention than in the prior art configuration. Additional kinetic modeling work indicates these resulting lower hydrocarbon losses improves light gas selectivity which is an important economic aspect of this invention.

Kinetic modeling work indicates this resulting lower hydrocarbon loss improves light gas selectivity (due to less thermal cracking in the dilute phase of the reactor) which is an important economic aspect of this invention. Based on these kinetic models, a 10% reduction in hydrocarbon leakage to the dilute phase leads to 1-3 vol % reduction in $C_{2-}$ yield. Under typical operating constraints, this would allow an FCC unit to increase gasoline yield by about 1% with a resulting decrease in bottoms yield of about 1% at constant feed rate. For typical economic scenarios in the petroleum industry, this shift will lead to significant economic credits.

What is claimed is:

1. A fluid catalytic cracking process, comprising:
    a) injecting a heavy hydrocarbon feed through one or more feed nozzles connected to an external fluid cracking reactor riser section wherein the external fluid cracking reactor riser section is in fluid connection with a lower internal reactor riser located inside of a fluid catalytic cracking reactor vessel;
    b) contacting the heavy hydrocarbon feed with a hot fluidized catalyst in the external fluid cracking reactor riser;
    c) passing at least a portion of the heavy hydrocarbon feed and the hot fluidized catalyst through the lower internal reactor riser;
    d) passing at least a portion of the heavy hydrocarbon feed and the hot fluidized catalyst from the lower internal reactor riser to an upper internal reactor riser; and
    e) retrieving a fluid catalytically cracked product stream and a spent catalyst stream from the fluid catalytic cracking reactor vessel;
    wherein at least a portion of the heavy hydrocarbon feed is catalytically cracked into lower molecular weight hydrocarbon compounds which are retrieved as the fluid catalytically cracked product stream; and
    wherein said fluid catalytic cracking reactor vessel, comprises:
    said lower internal reactor riser, wherein the lower end of the lower internal reactor riser is attached to the shell of the fluid catalytic cracking reactor vessel; and
    said upper internal reactor riser wherein the lower end of the upper internal reactor riser terminates in a conical section which is connected to a cylindrical sleeve section; wherein the upper section of the upper internal reactor riser is not in fluid connection with the dilute phase section of the reactor vessel, and at least two riser outlet ports are mechanically connected to the upper section of the upper internal reactor riser: and
    wherein the upper end of the lower internal reactor riser is in fluid connection with the upper internal reactor riser and the dilute phase section of the reactor vessel;
    the upper end of the lower internal reactor riser is not mechanically connected to the upper internal reactor riser; the largest diameter of the conical section of the upper internal reactor riser is larger than the diameter of the upper end of the lower internal reactor riser; the cylindrical sleeve of the upper internal reactor riser has a diameter larger than the diameter of the upper end of the lower internal reactor riser; at least a portion of the cylindrical sleeve of the upper internal reactor riser overlaps with at least a portion of the upper end of the lower internal reactor riser; and there is no mechanical means located in the region of the overlapping portion of the cylindrical sleeve of the upper internal reactor riser and the upper end of the lower internal reactor riser for restricting the eccentricity between the cylindrical sleeve and the upper end of the lower internal reactor riser.

2. The fluid catalytic cracking process of claim 1, further comprising:
    flowing a hydrocarbon-containing vapor from a dilute phase section of the fluid catalytic cracking reactor vessel into the upper internal reactor riser, wherein the hydrocarbon-containing vapor passes through an annular gap between the lower internal reactor riser and the cylindrical sleeve of the upper internal reactor riser section, wherein the velocity of the hydrocarbon-containing vapor through the annular gap is greater than about 10 ft/sec.

3. The fluid catalytic cracking process of claim 2, wherein the velocity of the hydrocarbon-containing vapor through the annular gap is about 10 to about 30 ft/sec.

4. The fluid catalytic cracking process of claim 3, wherein the riser outlet ports are each physically connected by a first conduit to a primary mechanical cyclone inlet port, Which primary mechanical cyclone is designed for centrifugally separating catalyst particles from the hydrocarbon-containing vapors, and wherein there are no openings in the first conduits except for the riser outlet port on the first end of the first conduits and the primary mechanical cyclone inlet port on the second end of the first conduits, and wherein at least one primary mechanical cyclone has a vapor outlet port which is physically connected by a second conduit to a secondary mechanical cyclone inlet port, which secondary mechanical cyclone is designed for centrifugally separating catalyst particles from the hydrocarbon-containing vapors, and wherein there are no openings in the second conduit except for the primary mechanical cyclone outlet port on the first end of the second conduit and the secondary mechanical cyclone inlet port on the second end of the second conduit.

5. The fluid catalytic cracking process of claim 4, wherein the acute angle between the conical section of the upper internal reactor riser and the axis of the upper internal reactor riser is from about 5° to about 25°.

6. The fluid catalytic cracking process of claim 5, wherein a transition length as measured from the top of the lower internal riser to the bottom of the conical section is from about 6 to about 36 inches when the fluid catalytic cracking reactor vessel is in the operating (hot) condition.

7. The fluid catalytic cracking process of claim 6, wherein the length of the overlapping portion of the upper internal reactor riser cylindrical sleeve and the upper end of the lower internal reactor riser is from about 6 to about 36 inches when the fluid catalytic cracking reactor vessel is in the operating (hot) condition.

8. The fluid catalytic cracking process of claim 7, wherein there is an annular gap between the lower internal reactor riser and the cylindrical sleeve of the upper internal reactor riser from about 1 to about 4 inches.

9. The fluid catalytic cracking process of claim 7, wherein the Eccentricity between the cylindrical sleeve of the upper internal reactor riser and the upper end of the lower internal reactor riser is greater than 10% in the operating (hot) position.

10. The fluid catalytic cracking process of claim 9, wherein the total residence time of the heavy hydrocarbon feed and the hot fluidized catalyst mixture in the external fluid cracking reactor riser, the lower internal reactor riser and the upper internal reactor riser is less than about 5 seconds.

11. The fluid catalytic cracking process of claim 2, wherein the fluid catalytic cracking reactor vessel further comprises a substantially horizontally displaced anti-coking baffle plate which substantially segregates an upper section of the fluid catalytic cracking reactor vessel from a lower section of the fluid catalytic cracking reactor vessel, wherein the anti-coking baffle is located in the fluid catalytic cracking reactor vessel at an elevation below the primary mechanical cyclone inlet port; the anti-coking baffle is mechanically connected to the upper internal reactor riser section, at least one primary cyclone, at least one secondary cyclone, or a combination thereof; and wherein the anti-coking baffle plate is free to move relative to the internal wall of the reactor vessel.

12. The fluid catalytic cracking process of claim 11, wherein the anti-coking baffle plate is comprised of a plurality of vapor transfer holes and/or open pipes, which penetrate through the anti-coking baffle plate wherein the vapor transfer holes and/or open pipes are located substantially adjacent to the upper internal reactor riser.

13. The fluid catalytic cracking process of claim 2, wherein the eccentricity between the cylindrical sleeve of the upper internal reactor riser and the upper end of the lower internal reactor riser is greater than 20% in the hot position.

14. The fluid catalytic cracking process of claim 2, wherein at least a portion of the inner diameter of the upper internal reactor riser above the conical section is greater than at least a portion of the inner diameter of the lower internal reactor riser.

15. The fluid catalytic cracking process of claim 4, wherein the height of the riser outlet ports, "R", are from about 1.0 to about 2.0 times the height of the primary mechanical cyclone inlet ports, "L".

16. The fluid catalytic cracking process of claim 4, wherein the height of the upper internal reactor riser, "U", is from about 3 to about 6 times the height of the primary mechanical cyclone inlet ports, "L".

17. The fluid catalytic cracking process of claim 4, wherein the length of the first conduit, "W", is from about 1.5 to about 3.0 times the height of the primary mechanical cyclone inlet ports, "L".

* * * * *